United States Patent
Karmi et al.

(10) Patent No.: US 7,653,200 B2
(45) Date of Patent: Jan. 26, 2010

(54) ACCESSING CELLULAR NETWORKS FROM NON-NATIVE LOCAL NETWORKS

(75) Inventors: Yair Karmi, Rishon Le Zion (IL); Sara Bitan-Erlich, Moshav Hadar-Am (IL); Stuart Jeffery, Los Altos, CA (US); Eyal Katz, Ramat Gan (IL); Yaron Peleg, Tel Aviv (IL)

(73) Assignee: Flash Networks Ltd (IL)

( * ) Notice: Subject to any disclaimer, the term of this patent is extended or adjusted under 35 U.S.C. 154(b) by 778 days.

(21) Appl. No.: 10/506,251

(22) PCT Filed: Mar. 13, 2003

(86) PCT No.: PCT/IL03/00209

§ 371 (c)(1),
(2), (4) Date: Sep. 10, 2004

(87) PCT Pub. No.: WO03/077572

PCT Pub. Date: Sep. 18, 2003

(65) Prior Publication Data
US 2005/0124288 A1 Jun. 9, 2005

Related U.S. Application Data

(60) Provisional application No. 60/363,567, filed on Mar. 13, 2002.

(51) Int. Cl.
*H04K 1/00* (2006.01)
(52) U.S. Cl. .................... 380/270; 380/273; 380/272
(58) Field of Classification Search ............... 380/270, 380/272, 273
See application file for complete search history.

(56) References Cited

U.S. PATENT DOCUMENTS

| 6,571,095 | B1 | 5/2003 | Koodli |
| 2002/0012433 | A1 | 1/2002 | Haverinen et al. |
| 2002/0091921 | A1 | 7/2002 | Kunzinger |
| 2002/0169966 | A1 | 11/2002 | Nyman et al. |
| 2002/0178358 | A1 | 11/2002 | Perkins et al. |
| 2003/0035409 | A1 | 2/2003 | Wang et al. |
| 2003/0054810 | A1 | 3/2003 | Chen et al. |

(Continued)

OTHER PUBLICATIONS

Nokiea Unveils Roaming Solution Using GSM, WLANs; Matthew Peretz; Oct. 17, 2001; 802.11-Planet.com.*

(Continued)

*Primary Examiner*—David Y Jung
(74) *Attorney, Agent, or Firm*—Gregory Scott Smith; Smith Frohwein Tempel Greenlee Blaha, LLC

(57) ABSTRACT

A multiple entity gateway for supporting cellular authentication from a non-cellular network, the gateway comprising a plurality of entities each located at a different one of a plurality of secure zones and having at least one gap between said entities across said secure zones, said gateway being configured to predefine communication signals allowed across said gap between said entities, thereby to filter out non-allowed signals, and provide secure cellular authentication for a communication originating from said non-cellular network. The gateway allows cellular users to connect to a cellular network via a wireless local area network such as a hotspot, use the services of the cellular network, the Internet and the hotspot at will, and be securely authenticated and charged through the cellular infrastructure.

39 Claims, 13 Drawing Sheets

U.S. PATENT DOCUMENTS

2003/0084321 A1  5/2003  Tarquini et al.
2003/0099213 A1  5/2003  Lee et al.

OTHER PUBLICATIONS

Roaming: A Bridge To Connect WLAN and 3G; Dongyun Zhou; Dec. 2002.*

Grouping Wireless Picocells to build a Local Area Wireless Infrastructure; Jost Weinmiller; year 2000.*

SIM-Based WLAN Authentication for Open Platforms, Ameen Ahmad et al., Intel Magazine; Aug. 2003.*

SSL-Based Lightweight Security of IP-Based Wireless Sensor Networks; Wooyoung Jung; Sungmin Hong; Minkeun Ha; Young-Joo Kim; Daeyoung Kim; Advanced Information Networking and Applications Workshops, 2009. WAINA '09. International Conference on May 26-29, 2009 pp. 1112-1117.*

Design and Optimization of VPN Security Gateway; Zhu Yanqin; Qian Peide; Hu Yuemei; Communications and Networking in China, 2006. ChinaCom '06. First International Conference on Oct. 25-27, 2006 pp. 1-4.*

Sizzle: a standards-based end-to-end security architecture for the embedded Internet; Vipul Gupta; Millard, M.; Fung, S.; Zhu, Yu.; Gura, N.; Eberle, H.; Shantz, S.C.; Pervasive Computing and Communications, 2005. PerCom 2005. Third IEEE International Conference on Mar. 8-12, 2005 pp. 247-256.*

* cited by examiner

ACCESSING CELLULAR NETWORKS FROM NON-NATIVE LOCAL NETWORKS

RELATED PATENT APPLICATION

This application is a National Phase Application of PCT/IL03/00209 having International Filing Date of 13 Mar. 2003, which claims priority from U.S. Provisional Patent Application No. 60/363,567 filed 13 Mar. 2002.

FIELD AND BACKGROUND OF THE INVENTION

The present invention relates to the accessing of cellular networks via local networks which are not native to the cellular system, and more particularly but not exclusively to providing users of a cellular system with the ability to access the enhanced services of a LAN or the like where available.

Interfacing between a cellular and a LAN system is problematic due to lack of compatibility of network types. Thus, for example cellular networks have security arrangements such as the SIM, which are simply not recognized by the LAN. If a cellular telephone attempts to connect to the cellular network via a LAN, it can only succeed in doing so if the cellular network is satisfied with its SIM credentials. Yet the LAN may not recognize parts of the SIM handshake as signals that need to be passed on, or may not pass them on correctly.

A further problem arises in that the LAN may allow connection to itself of terminal types that could not in themselves connect to the cellular network. If it is desired that such devices have the same access to the cellular networks then the LAN has to solve within itself all of the compatibility issues that arise.

The problem is how to provide services to users who are often cellular subscribers connecting via a. LAN and who may require services originating with the specific LAN to which they are connecting, Internet connectivity or access to cellular services. The problem may be broken up into two elements, 1) authentication of genuine cellular equipment via the LAN so that the cellular equipment can use the added advantages provided by the LAN, and 2) if and how to allow non-cellular devices compatible with the LAN, with access to services provided by or accessible via the LAN. In short, is it possible to allow cellular carriers to offer their subscribers access to Internet and other remote services, within or outside the cellular network, from local networks such as BlueTooth or 802.11b Wireless LAN, collectively designated as "Hot Spots", where the users accessing the local network are in possession of terminals with the interfacing means to access the Hot Spots?

It is desirable to support any terminals that are capable of connecting to the local network, such as laptops, PDAs, etc., without requiring them to have direct access to the cellular network. Neither is it desirable to require such devices to have cellular network compatible equipment (e.g. SIM card), as a condition for the Hot Spot access.

Attempting to provide cellular access from non-cellular access networks raises security issues and related design principles. Successful overcoming of such issues raises the potential of a system architecture that enables expansion of services provided by Cellular Mobile Operators into various type of local access gateways, e.g. Wireless LAN (WLAN) Hot Spots, Wireless local loop, broad band routers etc. The demand in the market is currently to support scenarios where most local wireless access networks are based on WLAN Hot Spots, and thus many of the specific examples herein are directed at such scenarios. Nevertheless, the problems discussed herein apply to scenarios where broadband modems are used for local access, or any other type of local access networks. The local access networks include those that may be deployed by the Cellular Mobile Operator itself, Public local access networks operated by some Internet Service Providers, e.g. public Hot Spots operated by Wireless Service Provides (WISPs), corporate networks or even Private local access networks. The problem is how to support wide and fast integrated deployment of the new services while strictly retaining and even improving on the security standards and data protection required by and characteristic of the cellular network.

The fast deployment of Public Wireless LAN (WLAN) Hot Spots, with its present small subscriber base, becomes both an opportunity and a challenge for Cellular Mobile Operators. The challenge is that new Wireless Internet Service Providers (WISPs) may eventually compete with the Mobile Operators in providing wireless services to the same customers. The opportunity is the increase in services Cellular Mobile Operators provide to their subscribers, by leveraging on their existing large subscriber base to obtain favorable roaming agreements with these WISPs and expand cellular services into WLAN Hot Spots.

The wireless access infrastructure and the number of Wireless Internet Service Providers (WISPs) are growing rapidly. The users are able to access network services from both Public WLANs (located in airports, coffee shops, hospitals, etc.) and Private WLANs (located in for example in corporate campuses).

The Cellular Mobile Operators today possess an efficient and almost entirely secure billing architecture that supports roaming, that is connecting through other networks, as long as the other networks are compatible cellular networks. Extension of the advanced cellular accounting and roaming mechanisms, to support various types of local access, such as WLAN access, and also to provide value added services in Hot Spots is tempting but not trivial due to the incompatibility with cellular networks described above. Mobile Operators may for example wish to grant their customers secure and non-secure access from WLANs to their own services and be able to charge their cellular accounts. Likewise the WLAN operators would like to enable cellular customers to be able to access their LANs for the services on offer and be able to charge a cellular account. Enabling users to roam between WISPs, access various types of services, benefit from a high security level and be charged by their Cellular Mobile Operator in a single bill is a significant challenge to the Mobile Operator.

Services accessed through the Hot Spot may be located in a public network such as the Internet, in a private network or a shared network (e.g. the Mobile Operator's network, or a corporate network). Examples are browsing, location-based services, virtual private network (VPN) access, email, MMS, etc.

There is thus a widely recognized need for, and it would be highly advantageous to have, an interfacing system for LAN to cellular WAN which operates seamlessly from the point of view of the user, and allows identification and charging of the user through the security of the cellular system.

SUMMARY OF THE INVENTION

According to one aspect of the present invention there is provided a multiple element gateway entity for supporting cellular authentication from a non-cellular network, the entity comprising a plurality of elements each located at a different one of a plurality of secure zones and having a first gap between the elements across the secure zones, the gateway being configured to predefine communication signals allowed across the first gap between the elements, thereby to filter out signals not part of an authentication procedure, and provide secure cellular authentication for a communication originating from the non-cellular network.

Preferably, the predefined communication signals allowed across the first gap comprise signals of a cellular authentication protocol.

Preferably, the signals of a cellular identification protocol comprise GSM triplet information.

Preferably, the predefined communication signals further comprise authorization information.

Preferably, the predefined communication signals further comprise status information.

Preferably, the elements comprise at least a front element for interfacing to the non-cellular network, a cellular network gateway element for interfacing to the cellular network, and a service gateway element for interfacing to a service IP network, and wherein the first gap is between the front element and the cellular gateway element.

Preferably, each one of the secure zones has a different level of security ranging from a lowest to a highest level of security, and the front element resides in a lower level one of the secure zones, the cellular network gateway element resides in a higher level one of the secure zones and the service gateway element resides in an intermediate level one of the secure zones.

Preferably, the front element resides in a lowest level one of the secure zones.

Preferably, the cellular network gateway element resides in a highest level one of the secure zones.

The entity may be configured to support the authentication via a first layer and to support subsequent communication traffic via a second layer, the entity further being configured to bind the first and the second layers to restrict the subsequent communication traffic to a user authenticated via the first layer.

Preferably, the binding is cryptographic binding.

Additionally or alternatively, the binding is non-cryptographic binding.

The entity may comprise secure channel support functionality for supporting a secure channel to a user client at the non-cellular network Preferably, the secure channel is allowed to the user client only as long as the user client is authenticated.

Preferably, the secure channel is identity protected, thereby to defeat eavesdropping.

Preferably, the secure channel is configured to carry communication traffic.

The entity may comprise a first end in a cellular infrastructure towards the non-cellular network, the first end having a first firewall.

The entity may further comprise a security gateway in place of one or both firewalls.

The entity is preferably configured to supply the first firewall or security gateway with a rule set comprising static rules to allow through signals belonging to the authentication procedure.

The entity may be configured to supply the first firewall with a rule, the rule permitting passage of data involving a user client, the supply being dynamically with authentication of the user client.

Preferably, the first firewall or security gateway is configured to restrict access to signals originating from applications within an authenticated user client, wherein the applications are recognized as compatible with the gateway.

Preferably, the first firewall is operable to receive from the cellular authentication at least one key, the firewall being configured to pass only material corresponding to the key.

Preferably, the key is at least one of an authentication key, an encryption key and a key providing both authentication and encryption.

Preferably, the first firewall is configured to restrict access from non-authenticated user clients to signals originating from applications within the user client which are recognized as supporting the cellular authentication procedure.

The entity may further comprise a second end towards a service IP network, the second end comprising a second firewall.

Preferably, the second firewall has a rule set for allowing signals to pass, the entity being further configured to supply the second firewall with a rule, the rule permitting passage of data involving a user client, the supply being dynamically with authentication of the user client.

Preferably, the secure cellular authentication is via an authentication layer and wherein communication traffic is via a second, traffic, layer, wherein the entity is operable to bind the authentication and the traffic layers so that communication traffic is only sendable via a device that has been authenticated.

Preferably, the secure cellular authentication comprises finding a subscriber account at a cellular provider user database and interacting with a connecting user device to bind the user account to the connecting user device.

Preferably, the cellular provider user database is a home location register.

Preferably, data for accessing the user database is obtained during execution of an access protocol from a connecting user device.

Preferably, the data for accessing is obtained from a SIM of a user device if present, otherwise from a virtual SIM if present, otherwise from a client entity of the user device and otherwise from a communication independently received from a subscriber's cellular device, and wherein the data for accessing comprises authentication data.

The entity is preferably configured to provide initial access to a connecting device via exchange of a single message with the connecting device.

Preferably, the initial message contains at least one of a temporary identity, a one-time password and a retries counter.

The entity is preferably configured to identify a situation in which two connecting devices attempt to authenticate themselves based on a single security element.

Preferably, the secure cellular authentication further comprises use of a one time password.

Preferably, the secure cellular authentication comprises use of a temporary user identity.

Preferably, the secure cellular authentication comprises a new session authentication procedure and a resumed session authentication procedure.

Preferably, the elements are located within a cellular provider's network infrastructure.

According to a second aspect of the present invention there is provided a user client for use with a multiple element gateway entity, the entity comprising a plurality of elements each located at a different one of a plurality of secure zones and having at least a first gap between the entities across the secure zones, the gateway being configured to predefine communication signals allowed across the first gap between the entities, thereby to filter out signals not part of an authentication procedure, and provide secure cellular authentication for a communication originating from a non-cellular network, the user client comprising usability for connecting to a wireless local network and usability for supporting the cellular authentication via the gateway entity.

The user client may be a virtual SIM.

According to a third aspect of the present invention there is provided a method for supporting cellular authentication from a non-cellular network, the method comprising:

locating a plurality of cellular authentication elements at different ones of a plurality of secure zones, arranging at least one gap between the elements across the secure zones, and defining communication signals to be allowed across the gap between the elements, thereby to filter out signals not part of an authentication procedure, and restrict passage across the gap to signals being part of the cellular authentication, thereby to provide secure cellular authentication for a communication originating from the non-cellular network.

According to a fourth aspect of the present invention there is provided a method for supporting cellular authentication from a non-cellular network, comprising:

setting a first rule to prevent exchange of data from non-authenticated devices over a communication route, receiving data from a connecting device on the non-cellular network, authenticating the connecting device over an authentication route using cellular authentication, and setting a second rule to permit the connecting device when authenticated to exchange data over the communication route.

According to a fifth aspect of the present invention there is provided apparatus for supporting cellular authentication from a non-cellular network, comprising:

a first route connecting the non-cellular network to a cellular authentication infrastructure, a second route for connecting the non-cellular network to a communication infrastructure, and a communication gateway at the second route for allowing data to pass along the second route only if the data is part of a communication involving a device on the non-cellular network which is authenticated by the cellular authentication infrastructure.

According to a sixth aspect of the present invention there is provided an authentication mechanism for use with a non-cellular network able to access a cellular authentication infrastructure, the mechanism comprising:

a cellular access protocol for allowing a connecting device to obtain authentication from the cellular authentication infrastructure, and a binding mechanism for binding the connecting device to the authentication so that only usage associated with the connecting device for the duration of the authentication is allowed via the non-cellular network.

Preferably, the connecting device comprises an authentication client.

Preferably, the authentication client comprises a SIM.

Preferably, the SIM is a virtual SIM.

Preferably, at least part of the cellular access protocol comprises exchanging messaging with a cellular device to whose identity the connecting device intends to be bound.

Preferably, the exchanging messaging is a one-way exchange between the cellular authentication infrastructure and the cellular device.

Preferably, the exchanging messaging is a two-way exchange between the cellular authentication infrastructure and the cellular device.

Unless otherwise defined, all technical and scientific terms used herein have the same meaning as commonly understood by one of ordinary skill in the art to which this invention belongs. The materials, methods, and examples provided herein are illustrative only and not intended to be limiting.

In the present disclosure, the term "cellular authentication" refers to any authentication method that cryptographically binds an accessing device to a cellular account, with or without a GSM-like SIM card.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
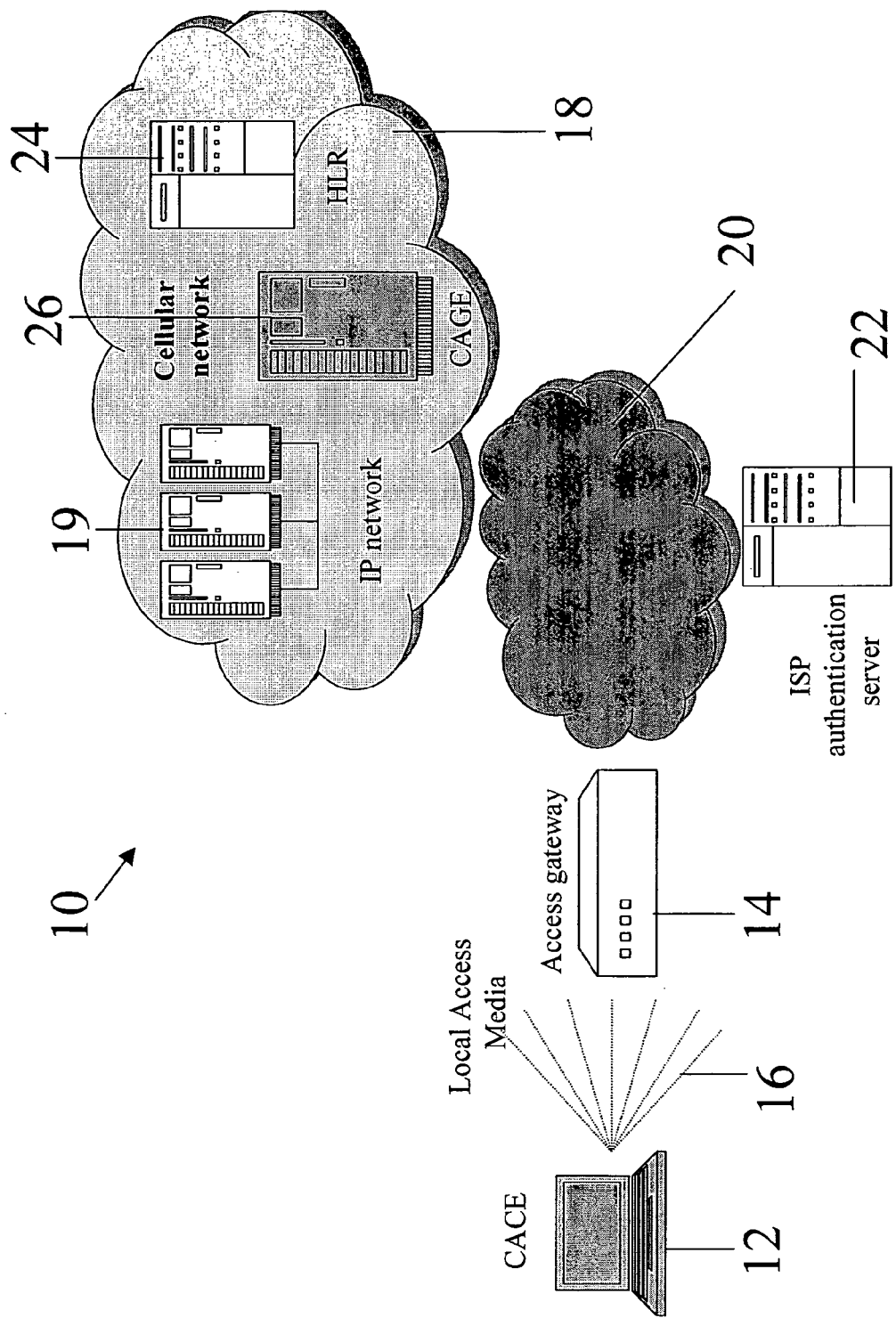
FIG. 1 is a simplified block diagram illustrating a network configuration for providing cellular authentication via a non-cellular local access network, operative in accordance with a preferred embodiment of the present invention.

The present embodiments show a system architecture for binding a user to his cellular user identification so that he can be securely authenticated using the cellular infrastructure even when he connects via non-cellular infrastructure such as a hot spot or any other kind of wireless LAN. The architecture is based on a cellular access network using a gateway entity (CAGE). In one embodiment the user connects via a client entity (CACE) which comprises applications supporting cellular authentication procedures. Another embodiment discloses authentication without a specific client entity. Instead of the client entity, other techniques as described herein are used to establish the identity of the user and bind him or her with the appropriate cellular account. In either case it is assumed that the user attempting to connect via the hot spot etc has a cellular account. The embodiments allow users accessing by whatever means to be authenticated and authorized for the requested services by the cellular network.

The principles and operation of a system architecture according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a simplified block diagram which illustrates a cellular access network (CAN) 10, operable in accordance with a first embodiment of the present invention, which a user attempts to access via a portable computer 12. The cellular access network 10 comprises an access gateway 14 which connects between local access media 16 such as a hotspot or other wired or wireless LAN on one side and the cellular network 18 and associated cellular infrastructure on the other hand. The physical connection between the gateway 14 and the cellular network 18, may be direct, or more likely, as shown in FIG. 1, through intervening IP infrastructure 20 including an ISP authentication server 22.

The cellular network 18 comprises standard cellular components such as the home location register HLR 24, which is a database of subscribers to the particular cellular network.

Figure 2:
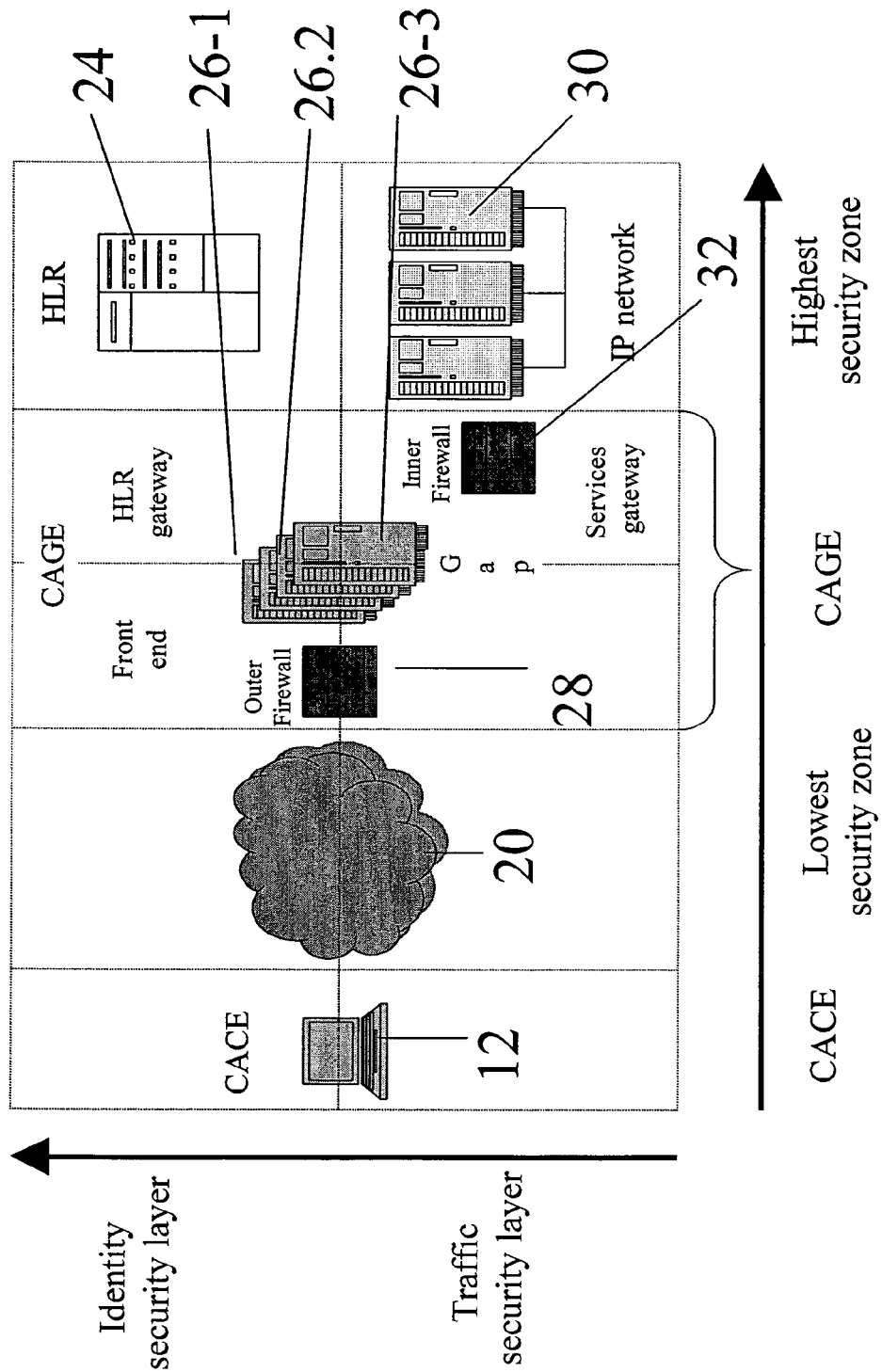
FIG. 2 is a simplified block diagram of the network configuration of FIG. 1, further illustrating the two dimensional nature of the preferred system architecture.

The network cellular network includes a multiple unit gateway entity, referred to herein by the acronym (CAGE) meaning cellular access gateway entity. The entity supports cellular authentication from a non-cellular network such as the local access media 16, using various procedures that will be described hereinbelow. The CAGE is shown in greater detail in FIG. 2, to which reference is now made. FIG. 2 illustrates the two-dimensional nature of the system architecture of the cellular access network of FIG. 1. The gateway comprises a plurality of units 26-1 . . . 26-n, each located at a different one of a plurality of secure zones. The units are each located in zones having different levels of security against unauthorized access and communicate with each other across what is known as a gap. The gap is a communication link in which the only communication allowed across is that defined by a given protocol. The protocol defines those communication signals which are allowed across the gap between the entities and those which are not, and the gap thus serves to filter out non-allowed signals. The signals that are allowed across are preferably those which are recognized as coming from a known authorization client and which are part of an expected authorization procedure. The gap thus makes sure that nothing except certain traffic, be it cellular authentication related traffic, or authentication application traffic, flows between the two sides of the gap.

Preferably the predefined communication signals allowed across the gap belong to the specific cellular authentication protocol which is native to the cellular network 18. Thus, if network 18 is a GSM network then the signals may include GSM triplet information. The predefined signals may include authorization information, that is information regarding the authorization of a given user to access data and services following authentication. Additionally, the signals may include status information regarding the user and the connection.

The CAGE 26 may further comprise secure channel support functionality for supporting a secure channel to a user client at the non-cellular network. A secure channel includes an authenticated channel and the channel may be privacy protected (confidential), to defeat eavesdropping. The secure channel may carry communication control signaling, usage data—say for billing purposes and even actual communication content if it is desired to maintain communication secrecy.

The CAGE 26 preferably has an outer or first firewall 28 separating itself from the intervening IP infrastructure 20. The firewall is preferably configured to restrict access to signals that come from within a user client compatible with the gateway, that is access to the CAGE is restricted to signals that are recognized to come from authentication applications that the CAGE would expect to be dealing with. Specifically the firewall is configured to further restrict access to signals of applications, within such clients, which support authentication procedures.

In a preferred embodiment, the CAGE is connected at its far end to a service IP network 30, and a second, or inner, firewall 32 protects the service IP network from the connection with the CAGE.

In some embodiments the connecting device comprises a client that has cellular compatible equipment such as a subscriber identification module or SIM. In other embodiments the connecting device comprises a software client. In yet further embodiments binding with the cellular account is provided where the connecting device does not possess a client entity.

A first embodiment is now considered in greater detail. Returning to FIG. 1, the cellular access network CAN comprises two components—the Cellular Access Client Entity (CACE) 12 and the Cellular Access Gateway Entity (CAGE) 26. The CACE 12 may in one embodiment include a SIM. In the following examples, access to a GSM based cellular network from a WLAN Hot Spot is discussed, but the skilled person will appreciate that any kind of local network access to any kind of cellular network is contemplated and can be supported by the presently described architecture.

The CACE 12 is installed in the subscriber's data terminal, which preferably includes WLAN access software and hardware. The CAGE 26 is installed within the Mobile Operator's network infrastructure 10, and serves as a gateway between the communication medium connecting the Hot Spot, through an intervening IP infrastructure 20—for example the Internet or a proprietary IP network, and the cellular network itself. The CAGE is an entity that allows the WLAN and the Cellular networks to work together. The CACE and the CAGE execute a set of protocols that bind a wireless laptop user with its cellular account. The authentication of such binding relies on information that the CAGE 26 retrieves from the Mobile Operator's HLR/AuC 24. The user's cellular account contains the user's authorization information, which may previously have been provided by the Mobile Operator. After the CAGE 26 authenticates the CACE 12, it enforces an authorization policy defined by the Mobile Operator. For example a given user may be restricted to certain services or to a certain number of prepaid units.

The CAN 10 preferably creates a secure virtual channel on top of a physical route that starts in the WLAN 16, moves through the interconnecting communication medium 20 (e.g. Internet) and finally terminates at the CAGE 26. The secure channel is preferably authenticated, identity protected from eavesdroppers and integrity protected. It may also be configured to provide confidentiality. The secure channel preferably carries at least control traffic and billing-related information. The CAN 10 may also be configured to create a secure channel for application traffic.

Overview of the CAN Security Architecture

Returning now to FIG. 2, the CAN security architecture is a modular two-dimensional architecture. In FIG. 2, axes, arbitrarily chosen as vertical and horizontal, represent security dimensions. The vertical axis represents the purpose of data traveling through the system, identity or authentication data on the one hand and traffic or communication body data on the other; the horizontal axis represents the physical location of the entities the data travels through.

Along the vertical axis the CAN is thus divided into two separate layers—the identity security layer and the traffic security layer. The identity security layer is responsible for user/network authentication, including binding of the user to the cellular account and obtaining usage information, typically for billing purposes. That is to say the identity security layer is responsible for protecting control information. It prevents users from binding to someone else's account and the like and ensures that the correct account is charged for the usage. The Identity security layer is also responsible for the transfer of cryptographic or other types of information to the traffic security layer that enable the traffic security layer to perform its responsibilities. The traffic security layer on the other hand is responsible for verifying that the application traffic indeed originates from an authenticated and authorized user (by using the cryptographic information provided by the identity security layer), and for the protection of such user application traffic, preventing modification, eavesdropping and the like. The traffic layer is preferably further split within architectures supporting multiple levels of application traffic security.

The skilled person will appreciate that binding between cellular authentication on the one hand and usage or application data on the other hand is preferably but not necessarily cryptographic, and applies even if the two functions are not separated into distinct layers.

Along the horizontal axis the CAN is divided into various physical zones. The zones differ from each other in their level of security. A zone with a high security level is a zone that is not especially exposed to attacks, either because it lies in a physically protected area (e.g. the AuC) or because it is located in the trusted premises (e.g. the HLR and CAGE that reside within the Mobile Operator's premises). It is unlikely that attacks will be launched from high security zones, since it is hard for attackers to access the zones. In particular it is hard to access the equipment located in the secure premises in such a way as to be able to use the equipment to mount an attack. On the other hand, since anyone can access low security zones (e.g. the Internet), many attacks originate within such low security zones. Hence, the CAN 10 is expected to supply strong protection at least to services that are installed in low security zones and to traffic that traverses such low security zones. that is to say, since the CAN 10 is connected both to low security zones, and to high security zones, a major consideration is to make sure that attacks that originate in low security zones, do not have any effect whatsoever on equipment and data residing in high security zones.

Now the security layout depicted by FIG. 2 may entail associations between specific layers and specific system elements. Thus the CACE 12, part of the connecting device, invariably resides in a low security zone and operates both in the identity and the traffic security layers. The CAGE is preferably divided into three parts, a front end 26.1 which interfaces with the non-cellular network, an HLR gateway 26.2 which interfaces with the cellular infrastructure and a services gateway 26.3 which interfaces with the cellular IP infrastructure. In other embodiments there may be other gateway elements located within the CAGE 26. The front end 26.1 typically resides in a medium security zone and operates in the identity security layer. The front end 26.1 preferably prepares cryptographic or other information for the traffic security layer); the HLR gateway 26.2 resides in a high security zone and operates in the identity layer; the services gateway 26.3 resides in a medium security zone and operates in the traffic layer. The idea is that authentication of a connecting device is carried out through the front end, with the assistance of the HLR gateway and then data traffic from the authenticated device is allowed through the services gateway.

Now, since the CAGE 26 resides in multiple security zones, its components are separated by a gap. As explained above, information crossing the gap is strictly controlled so that an attack on a low security part of the CAGE does not necessarily lead to vulnerability of other parts of the CAGE.

CAN Vertical Security Zones

The lowest security zone is the interconnecting communication medium, which in many cases is the Internet, since LANs are often connected to the Internet. The highest security zone is that of the cellular infrastructure and contains the HLR and its attached AuC. Another high security zone (though lower than the previous zone) contains the cellular IP network 19, where the services themselves are located. The CAGE 26 accesses the HLR 24 during the CACE-CAGE registration process. The registration binds the wireless laptop user and his cellular account. Registration is carried out within the identity security layer. The CAGE 26 routes traffic from the interconnecting communication medium 20 (the lowest security zone) to the service IP network 30 where it grants services to those clients that have been successfully authenticated and are now found to be authorized to receive the services.

As described above, the CAGE has interfaces to both the highest security zone and the lowest security zone. Such interfacing raises a number of network security issues. For example it may open a security breach in a scenario in which the CAGE 26 is manipulated by an attacker, who tries to use the CAGE as a relay from the low, easy to attack zone to which he has access, to the high zone. Such a scenario opens the highest security zone to threats and attacks originating in the lowest security zone.

To protect the highest security zones from possible attacks of such a nature, the CAGE 26 is divided into the three elements or components outlined above, namely the CAGE front end 26-1, the HLR gateway 26-2 and the services gateway 26-3. To provide maximum security, each one of these components is separated from the others by a gap of the kind described above in which information exchange is severely restricted. The nature of the restriction applied to each gap depends on the kind of data that may legitimately be expected to pass via the given gap. Thus the gap from the front end to the HLR gateway is expected to carry authentication and security data only and is restricted accordingly. The gap between the front end and the service gateway is expected to carry communication traffic to and from the authenticated device and it too is restricted accordingly. It will be appreciated that the components may be constructed from physically integrated elements or physically split elements or from a combination of the two, and such physical construction does not modify the architecture proposed herein.

Figure 3:
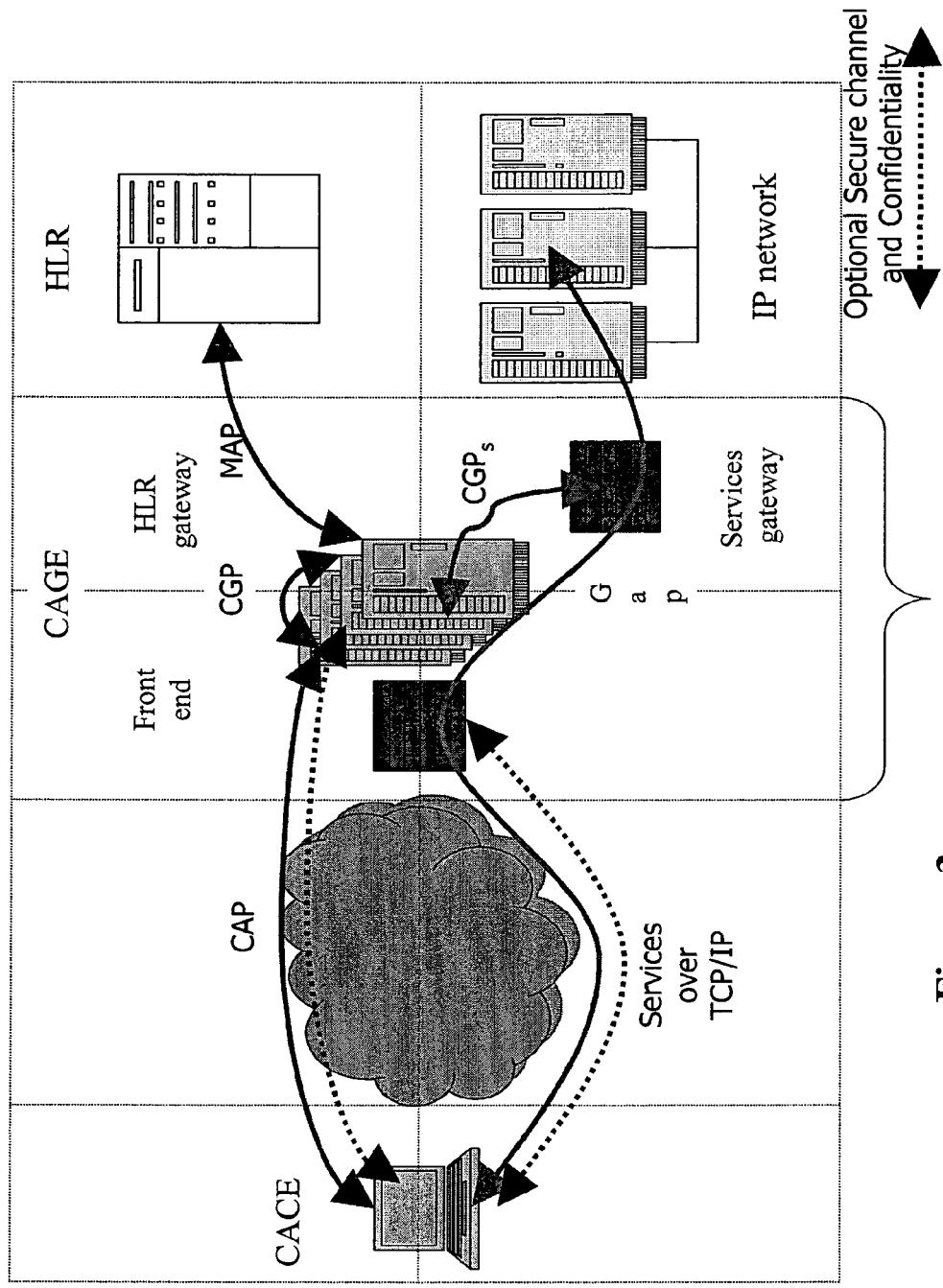
FIG. 3 is a simplified block diagram illustrating how different protocols are used over different parts of the network configuration of FIG. 1.

Reference is now made to FIG. 3, which is a conceptual block diagram of the architecture of FIG. 2, and parts that are the same as in previous figures are given the same reference numerals and are not described again except to the extent necessary for an understanding of the present figure. FIG. 3 comprises indications of protocols used for communication between the different components. The CAGE front end 26-1 is separated from the intervening IP infrastructure 20, by a standard commercial firewall 28. The gap between the CAGE Front End 26-1 and the HLR Gateway 26-2 is implemented by allowing connection between the two elements only over a certain protocol designed to provide the necessary protection in the form of signal restriction. In the present embodiments a protocol referred to as $CGP_I$ (Cellular Gaping Protocol) is used. The protocol runs between the Front End and the HLR Gateway, and is the only protocol that is permitted to cross the gap between the two above-mentioned elements. In other words, only signals that conform with $CGP_I$ are able to cross the gap, and other signals, which would presumably be needed by an attacker wishing to control the cellular network, are excluded. $CGP_I$ sends queries and receives responses regarding authentication information. For example, if the cellular network is a GSM based network then the $CGP_I$ would allow GSM triplets as well as authorization (privilege) and status information. No information that is not defined within the protocol may pass across the front-end/HLR gateway gap.

In addition, the CAGE Front End 26-1 and the HLR Gateway 26-3 preferably contain mechanisms that protect the HLR interface (and the AuC) from DOS (Denial of Service) attacks.

The second gap, between the Internet 20 and the firewall 28 and the service IP network 30, or in terms of the CAGE between the front end 26-1 and the service gateway 26-3, is crossed only by applications run by authenticated and authorized CACEs and which require access to the service IP network 30. In the case of this second gap, the use of a gaping protocol alone is not appropriate as general communication traffic is expected to cross. Instead an arrangement of firewalls is preferred. As described above, the two firewalls, or preferably a security gateway or VPN server 28 and a firewall 32 are used, and by binding the two devices to the authentication, as will be detailed below, it is possible to ensure that only authorized traffic crosses the gap. Firewall/security gateway 28 is located between the Internet 20 and the CAGE front end 26-1 and applies access control both in the identity security layer and in the traffic security layer. Alternatives for the implementation of this firewall, and an example rule set appear hereinbelow. Firewall 32 separates the services IP network 30 from the CAGE services gateway 26-3. Discussion on the implementation of the inner firewall also appears below. Preferably, binding of the two layers is carried out by adding to the firewalls a temporary rule, or cryptographic information identifying an authenticated device and allowing traffic from the authenticated device to pass the second gap. It is noted that even with the rule, traffic from the authenticated device is not able to cross the first gap because it does not conform to the gaping protocol.

CAN Horizontal Security Layers

The security architecture of the CAN 10 is implemented in two separate horizontal layers, as explained above. The first layer is the identity security layer. The identity security layer binds the laptop user with his cellular identity. The layer mutually authenticates the user and the cellular network, verifies that the user is authorized to use the services he is trying to access, and provides usage and billing information to the cellular network. The identity security layer provides anonymity (identity protection) to the user in that the user's cellular identity is never transmitted, and the layer is authenticated and integrity protected. Privacy protection of the identity security layer is optional.

The second layer is the traffic security layer. The traffic security layer provides protection for application traffic. The traffic security layer comprises protocols for secure channel establishment and implementation. The traffic security layer in the CAN may be implemented by any one of several different security protocols. Examples of protocols that can be used in the traffic security layer include IPsec ESP (Encapsulating Security Payload), ESP with NULL encryption, SSL (Secure Sockets Layer) and TLS (Transport Layer Security). ESP-NULL provides data source authentication, integrity protection and protection against replay. The other three protocols provide all of the above and confidentiality in addition. The Mobile Operator can select a specific protocol for the implementation of the traffic layer security according to the types of services he wishes to offer to his customers and according to his network topology.

The Identity security layer and the traffic security layer are preferably bound together, by cryptographic or other means, to ensure that the entity that has authenticated itself to the cellular network is the same entity establishing and using the secure channel. The authentication protocols of the identity security layer produce symmetric keying material that can be used to create or to authenticate the secure channel establishment stage of the traffic security layer. For example, the symmetric authentication keys produced by CAP, can be used as pre-shared secrets in IKE (the IPsec key management protocol) phase I.

The Identity Security Layer

As described, the identity security layer is intended to provide authentication and binding between the laptop user and his/her cellular account. The identity security layer is preferably independent of traffic generated by general applications running on the user data terminal. The identity security layer typically provides the following services:

1. Mutual authentication of user and system
2. User anonymity
3. Billing support
4. Optional confidentiality The identity security layer is preferably implemented using a combination of:

the Hot Spot initial access authorization between the data terminal and the hotspot, CAP (Cellular Access Protocol) between the data terminal and the CAGE, CSP (Cellular Setup Protocol)—see below, $CGP_I$ (Cellular Gaping Protocol) within the CAGE, and MAP (Mobile Application Part) between the CAGE and the HLR, as illustrated in FIG. 3. MAP is a standard SS7 protocol, while the others are proprietary protocols and other providers may use other protocols in their place. CSP is used for a first time, setup-completion initialization of the binding between the CACE and the user cellular account, and it is not part of the regular workflow executed by the CAN; hence, it is not depicted in FIG. 3.

The identity security layer supports two user authentication modes: SIM-based, typically for GSM networks and cellular-compatible devices that is devices that have SIM card readers installed, and SIM-less generally for other types of devices and or other types of networks. The authentication in both modes relies on a TUNI (Temporary User Name Identity, or a pseudonym) and an OTP (One Time Password). A TUNI must be used in order to support user anonymity. An OTP must be used to protect against theft of WISP (wireless service provider) accounts by means of eavesdropping and replay. SIM-based authentication refers to the case where the terminal of the user accessing the network is in possession of an authentication mechanism identical to that used by a standard cellular device; this is the SIM in GSM, USIM in UMTS or corresponding data and software in networks not using such a physical device. SIM-less authentication refers to the case where the authentication is somehow linked to a different cellular device belonging to the same user (whether within a separate unit, separate module, etc.). The following paragraphs explain the proposed methods or apparatuses for GSM and GPRS, however they apply by extension to all other networks.

In the SIM-based authentication mode a SIM is installed in the user laptop; it is used to bind between the user laptop and the user cellular account. This binding is based on the user account key secret $K_I$, embedded in the SIM.

The binding between a SIM-less user laptop and the appropriate user cellular account is effected by CSP. CSP authenticates the user and verifies his privileges. It supplies a master password that is stored in the user laptop, taking the place of the SIM $K_I$ functionality. CSP is discussed in greater detail below.

A user laptop that has a SIM-less installation of the CACE software might be open to the kind of attack that a SIM-based installation is protected from by the physical properties of the SIM. The CACE software would therefore constitute a virtual SIM. An attacker might somehow be able to copy the CACE internal database or the virtual SIM, and invest the required amount of work to create a copy of the master password stored in the user laptop. Once an attacker clones the master password, he can impersonate the legal user. The CAN 10 therefore contains an anti-cloning mechanism whose purpose is to detect password cloning. The mechanism works by detecting that two different clients are using the same master password to generate a legal access password. From such a detection it concludes that the SIM less client was cloned.

When such cloning is detected, since it is impossible to determine who is the real user and who is the clone, the user account is revoked. Alternative schemes to deal with suspected cloning may be agreed upon, depending on the Mobile Operator's policy for dealing with cloning. To reactivate the user, the device is preferably reinitialized, (setup) using CSP. The CAGE runs the cloning detection mechanism when the user terminal (e.g. laptop) tries to authenticate itself to the WISP, during the initial access approval, and when the user authenticates himself to the CAGE in the new session authentication exchange of CAP.

The Cellular Setup Protocol (CSP)

As mentioned above, CSP operates between the user laptop and the CAGE Front End, preferably over an out of band channel, i.e. a channel not established by the CAN (e.g. a wired LAN, or a free hot spot WLAN). CSP runs over a secure channel, preferably initially implemented by SSL, and fulfills the following purposes:

1. Binding a SIM-less user laptop to the corresponding cellular account,
2. Equipping the SIM-less laptop with an authenticated master password (or with a Virtual SIM, as explained above),
3. Initializing both SIM-based and SIM-less user laptops with first time Temporary User Name Identifiers (TUNI),
4. Initializing the SIM-less user laptops with a One Time Password (OTP) Generating Key, and
5. Downloading the configuration of the CAP secure channel and the application traffic secure channel.

Initialization of the user with a first time TUNI and an OTP generating key, stages 4 and 5 above at the completion of setup are preferably carried out over a secure channel to ensure user anonymity and prevent unauthorized access to WISP accounts. Such unauthorized access could be possible if a static password is used for first time access. The OTP generating key enables the CACE 12 to generate a new OTP whenever the user attempts to connect to the CAN 10.

The SIM-based mode of CSP is almost identical to the new session authentication exchange of CAP described hereinbelow. The differences are that an OTP is not sent by CSP, rather, in CSP the IMSI (International Mobile Subscriber Identity is used as the user's cellular account identifier, while CAP uses the TMSI-equivalent TUNI for the same purpose. It is pointed out that the user's identity remains protected since CSP always runs over a secure channel. In the SIM-based authentication mode there is no need to supply a first time OTP to the parties since they already have authentication information stored in their respective SIMs. When the CAGE Front End 26-1 receives the first message with the IMSI, it uses $CGP_I$ to communicate with the HLR Gateway. The latter verifies with the HLR that the user is entitled to use the services supplied by the CAGE.

Figure 4:
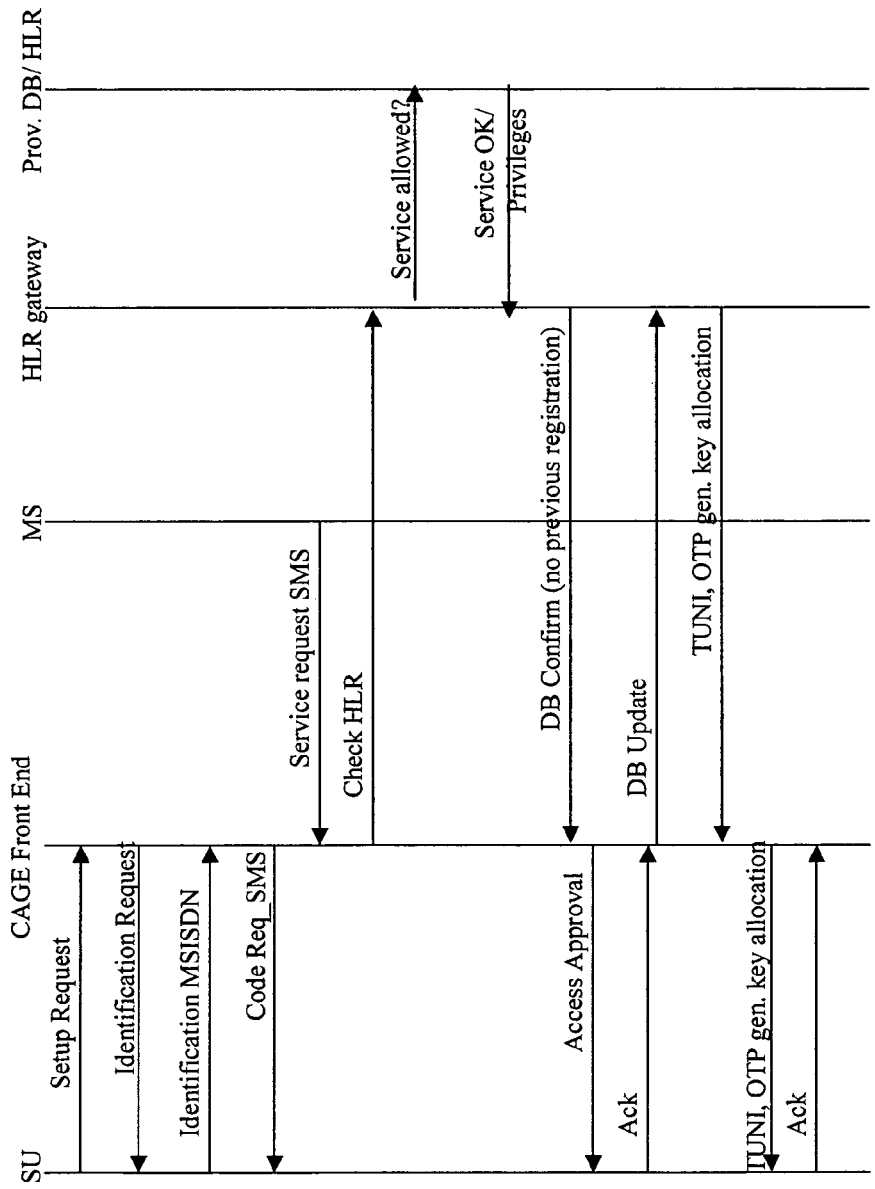
FIG. 4 is a simplified signal diagram indicating signal exchange within the cellular setup protocol in the case of SIM-less identification, according to a preferred embodiment of the present invention.

Reference is now made to FIG. 4, which is a signal diagram showing the exchange of signals in the SIM-less CSP authentication mode according to a preferred embodiment of the present invention. The procedure begins with a setup request from the CACE to the CAGE front end. Receipt of the setup request prompts an identification request from the CAGE front end to the CACE which is answered with the MSISDM.

The SIM-less mode of CSP identifies the user through its MSISDN/MIN/ and the number of his cellular telephone. The user then makes use of his cellular telephone to verify his identity. The authentication of the user is based on his ability to exchange with CAGE an SMS-based, secret, temporary access code. The exchange is carried over a combined secure loop comprising a cellular channel (the user's own SIM-equipped phone) and data network access (e.g. Internet) channels. The temporary code expires after a short configurable period (e.g. 10 minutes). CSP thus uses the SMS to bind the user laptop and his cellular account.

Initial Access Approval

Figure 5:
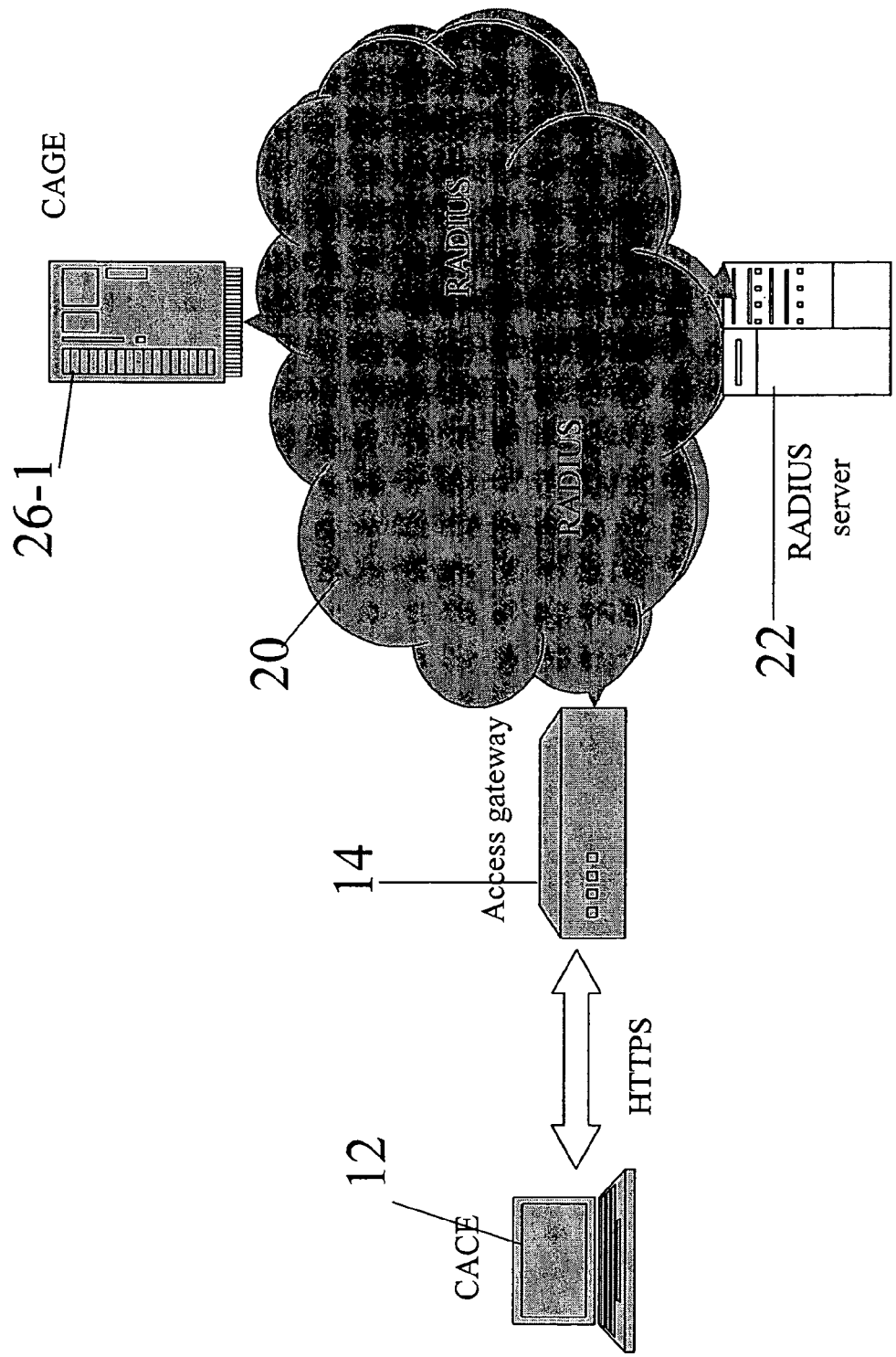
FIG. 5 is a simplified block diagram indicating elements involved in initial access approval at a local access network according to a preferred embodiment of the present invention.

Reference is now made to FIG. 5, which is a schematic diagram illustrating apparatus involved in initial access approval. The figure shows the CACE 12 connecting to the CAGE front end 26-1 via an access gateway 14 and the wireless hot spot (WISP) infrastructure 20 implemented via a radius server which serves as a WISP authentication server 22. An initial access approval procedure serves to authenticate the user to the WISP system. The procedure is preferably executed after CSP, as described above, has been completed successfully. The initial access approval is preferably implemented using several protocols together. The user laptop, via the CACE 12, and the CAGE Front End do not communicate directly during the initial access approval. They communicate through at least one, possibly multiple, RADIUS servers that relay information between them. The trigger that initializes the initial access approval is a login request that the user laptop sends to the Hot Spot. The login request is preferably sent to the Hot Spot using the HTTP protocol. The Hotspot then sends a login screen to the laptop, over HTTP or HTTPS, depending on the Hot Spot policy. The user laptop sends user login information to the hot spot in response (e.g. user-name, password). The hot spot then sends this information to the WISP authentication server 22. Currently available hot spots are able to display a constant login prompt to the user, but can relay only one message containing authentication information to the authentication server 22; hence the authentication must be based on a single one username/password pair and cannot, for example be based on a challenge/response pair. Schemes based on simple, that is constant, username/password authentication are exposed to various attacks (e.g. replay attack, dictionary attack), hence are not sufficiently secure. The Initial Access Protocol (IAP) is protected against both these types of attacks, but is exposed to certain types of so-called 'man-in-the-middle' attacks; hence use of IAP is preferably accompanied by the CAP protocol in order to be secure. If the hotspot does not have the single message limitation, and is able to relay multiple message exchanges between the accessing terminal and the authentication server, then the Initial Access Approval Protocol can simply be replaced with the CAP new or resumed authentication exchange as will be explained below. In particular such is possible in hotspots supporting the 802.1X standard).

It is pointed out that FIG. 5 depicts RADIUS merely as an example of an authentication protocol, and the skilled person will appreciate that other protocols may also be used.

If the WISP that operates the Hot Spot has an agreement with the Mobile Operator, then the Hot Spot uses the RADIUS protocol to relay the login request to the CAGE. Other protocols agreed upon by means of bilateral agreements between the WISP and Cellular Mobile Operator may also be supported.

The Hot Spot login information comprises two fields: the user name field and the password field. The user name field is filled up with a TUNI; the password field is filled up with a pseudo-random OTP, a retries counter, and an optional clue which is explained in greater detail below. The CACE software 12 generates the OTP as a function of the last successful new session authentication and the counter. In the SIM-less mode, the CACE uses the virtual SIM master key in the generation process, while in the SIM-based mode, the CACE uses the SIM for this purpose. The counter is used for OTP synchronization and for SIM-less password cloning detection.

When the CAGE 26 receives a RADIUS or equivalent query that originates at the Hot Spot Access Gateway/Server 14, the CAGE executes an initial access approval process. In certain cases access may be required from a given WISP to a cellular network in the absence of a specific arrangement between the two. In such a case special arrangements based on temporary allocation of access accounts from a special pool may provide temporary relief until such a specific arrangement is signed between the WISP and the Mobile Operator.

Figure 6:
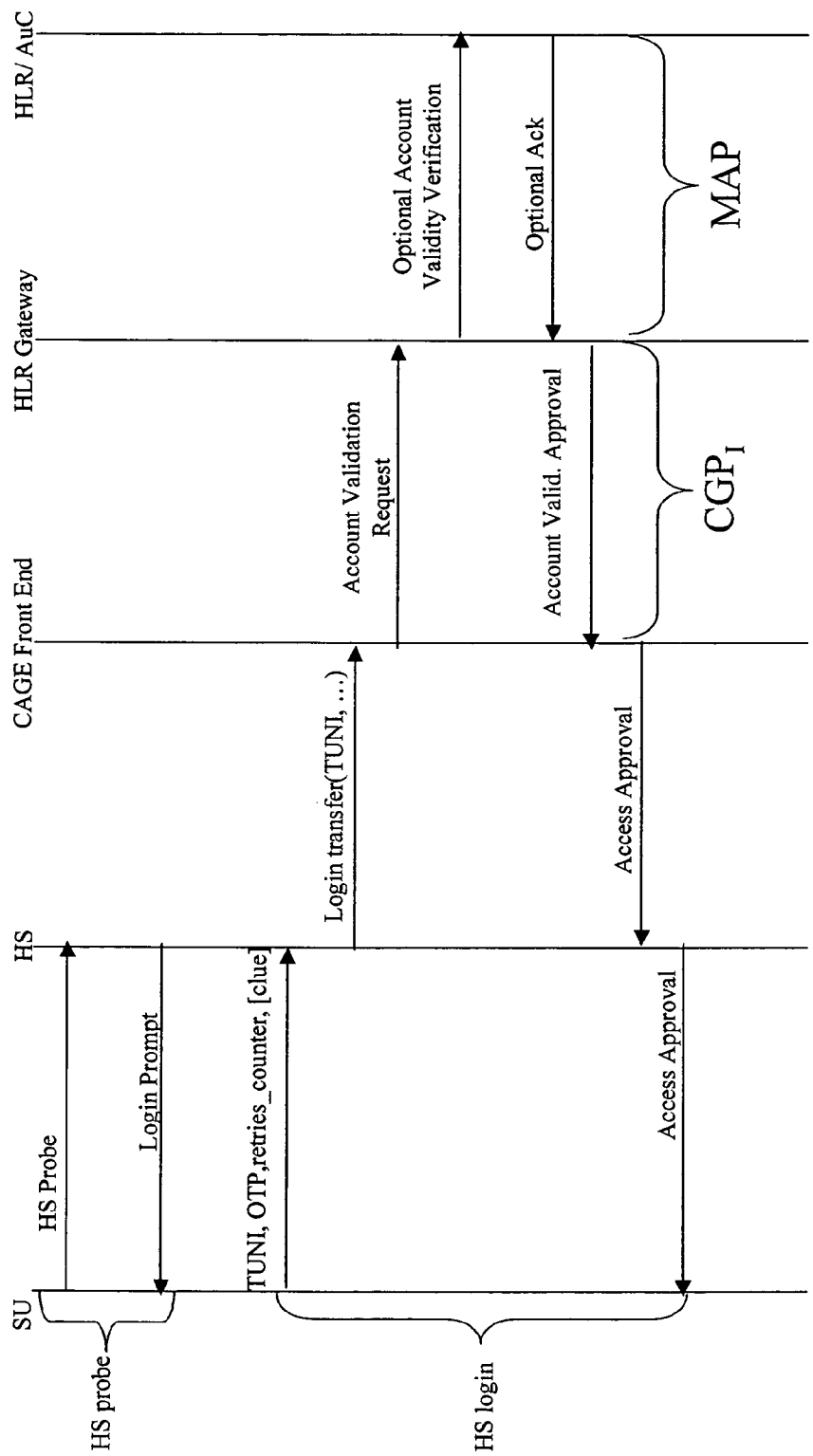
FIG. 6 is a simplified signal diagram indicating signal exchange for initial access approval in a preferred embodiment of the present invention.

When the CAGE Front End 26-1 accepts the RADIUS query, it uses the TUNI to identify the user cellular account. It then checks the password field to verify that the OTP is legal and the client is not cloned. The cloning checks are particularly relevant to the SIM-less authentication mode. Since a new OTP is generated each time the CACE attempts to connect to the network, the CAGE 26 has a special mechanism for OTP recovery that is used if one of the parties loses synchronization between the last successful connection and the current initial access approval. If the TUNI and the OTP are legal, then the CAGE queries the HLR, preferably using the CGP protocol discussed above and through the HLR gateway 26-2, and verifies that the user account is still valid, and that the user has the required privileges. CAGE has the flexibility to determine validity and privileges outside the HLR, if the Mobile Operator wishes to configure the cellular system architecture accordingly. If the CAGE front end 26-1 successfully authenticates the user, it sends a RADIUS response to the appropriate RADIUS server. Once the initial access approval is completed successfully, the user accessing terminal can communicate directly with the CAGE Front End 26-1, and they begin an authentication exchange session. A sample initial access approval message flow (with RADIUS servers) is depicted in FIG. 6 to which reference is now made. FIG. 6 is a message flow diagram showing an example of message flow for initial access approval. Probing from the unit attempting to connect is responded to by a log-in prompt. Thus begins a hot-spot (HS) log-in procedure which is similar for both the SIM-based and SIM-less cases. A temporary user name identity (TUNI) is provided, as is a one-time password. As necessary a retries counter is included, and in the SIM-less case a clue is included, as will be explained in greater detail below. Log-in details are transferred to the cage front end which then sends a validation request to the HLR gateway. Optionally, account validity verification is made to the HLR which responds with an acknowledgement. It is noted that communication to the HLR is carried out using the MAP protocol. Then an account valid approval is issued back to the CAGE front end, and access approval is then relayed back from the CAGE front end to the hot spot and back to the connecting device.

Considering the initial access approval protocol in greater detail, the procedure comprises a set of protocols that are executed between the CACE, denoted SU in the figure, the local access gateway, denoted HS in the figure, and the CAGE. Other participants may typically include intermediate RADIUS servers operating as RADIUS proxies (see FIG. 5)

or similar authentication entities. The initial access protocol is preferably executed only when the CACE identifies that the Hot Spot issues authentication queries to the CAGE.

The trigger that initializes the initial access approval protocol is the login request that the CACE sends to the Hot Spot. As described above, the response to the Hot Spot prompt contains three fields: TUNI, OTP, and retries. The TUNI serves as a temporary user identifier, and OTP serves as a one-time password. OTP is the result of a pseudo-random one-way function (PRF). The OTP generating key is the key to the PRF, the other inputs are the retries counter and for the SIM-less case, a clue. The retries count enables the CACE to generate a new OTP each time it tries to connect to the CAGE. The OTP generating key in the SIM-based mode is derived from key data $K_c$ that the CACE and the CAGE shared during the last new session authentication. In the SIM-less mode the OTP generating key is the master password that the CACE received from the CAGE during CSP.

Since the OTP depends on the last successful new session authentication, there is a possibility that the CACE and the CAGE will lose synchronization when one of them determines that the session authentication has ended, and the other still thinks that the authentication has not been completed. The CAGE has a mechanism that recovers from synchronization loss, which is described now.

The purpose of the synchronization recovery mechanism is to adhere to the requirements listed below, one for both types of installations and the remainder for SIM-less installation. Requirement 1 is to create an authentication mechanism, based on one message, that enables the CAGE to determine if the user is a legal user of the CAN. Such a mechanism is preferably protected against replay attacks, typically by means of a one time password mechanism. For SIMless mode: the SIM less authentication is linked to the user's GSM account. Thus, only a legal GSM user is able to obtain a legal out-of-band password that can be used for SIM-less authentication. When SIM-less authentication is used, we assume that the authentication information can be duplicated; hence the authentication includes inserting mechanisms that detect cloning of the CACE. Such mechanisms rely on synchronization of initial sessions between the CACE and the CAGE.

The rational for the resynchronization mechanism is the following: in the beginning of the initial access approval protocol, and the new session authentication protocol (in the first message of the authentication protocol), the CACE sends a fresh proof of the last session that it successfully participated in. The proof is a result of a PRF applied to the random strings that the CAGE transmitted in that session, and to a retries counter. In the SIM-less mode, the key to the PRF is an authentication secret master password (KI_key). In the SIM-based mode, the key to the keyed hash is the last shared key (CAGE_$K_c$) that was generated by the parties.

Since the OTP depends on the result of the last successful new session authentication, there is a possibility that the parties lose synchronization, and identify two different sets as the parameters of the successful new session authentication. In order to recover from such a loss of synchronization scenario, the CAGE holds two candidate sets of parameters for the last successful new session authentication exchange: the last exchange that the CAGE considers to be completed, and the previous exchange. When the CAGE receives the OTP, it checks it against the two sets of parameters. If the OTP was calculated by the presumably completed session, than it replaces the previous sets of parameters with the new one, and deletes the old one. Otherwise it continues to maintain the double set. During execution of the new session authentication exchange, the CAGE replaces the old set of parameters with the new one, and it calculates a new set for the presumably completed exchange.

In the SIM based version, the only purpose of OTP is to serve as a one-time password that enables the CAGE to identify the CACE as the one that participated in the last successful session.

In the SIM-less version, OTP has another purpose, cloning detection. If at some point in time, the state of a certain CACE (including the KI_key) is duplicated on another user terminal (e.g. laptop), then the CAGE receives proof from two user terminals that is based on the same set of last session parameters, and on the same master password, although the counter value might be different. The CAGE preferably recognizes such a situation, and thus identifies CACE cloning.

As mentioned before, OTP is the result of a PRF applied to the last challenge the CAGE had sent to the CACE, with a KI_key being the key. If the CAGE finds that the OTP provided is not legal for the current CACE, that is to say it is not a result of a PRF of the last session, then it checks to see if it is the result of CACE cloning. It preferably also checks whether the OTP ever was legal for the current CACE. To perform such a check it preferably re-generates the value challenge2 that it had sent to the present CACE. The CAGE re-generates the challenge value by using the clue variable that the CACE sends during the initialization procedure, and checks if OTP is valid for the value of challenge2. If the check verifies, then the CAGE knows that the first message is either a replay of an old message, or that CACE cloning has occurred.

The challenges that the CAGE generates are the result of a PRF applied to a local secret, and a random string (the clue). The CAGE uses the variable clue as its "memory" for the challenge re-generation, but instead of storing it in its own memory (which entails having an extremely large memory), it uses the CACE's memory.

Since the authentication synchronization string is used as an OTP for the Hot Spot, the CACE preferably sends a different OTP whenever it starts (or restarts) a new authentication session or an initial access approval, otherwise the CAGE will not be able to distinguish between cloning and legitimate retries. For this purpose the CACE sends a counter retries that is included in the PRF. The CAGE preferably checks that the value of retries is increasing.

If for some reason the CACE loses its state information, including the values of the last challenge1 and challenge2 that were used, then it preferably retrieves a new KI_key, through the CSP.

The authentication synchronization mechanism cannot distinguish between cloning and simple replay. The CAGE can verify with a high degree of certainty that an attacker is using a cloned CACE, but it preferably allows the attacker to continue, checking whether it responds correctly to the challenge the CAGE sends to CACE. Since we want to fulfill the requirement to support hot spots that are able to relay only a single message to the authentication server, we have decided not to add an extra round trip, but to use the following distinction.

We assume that the attacker who launches a replay attack can replay only a limited number of messages over and over, while an attacker who uses a cloned CACE is able to perform an unlimited number of retries. An attacker who launches a replay attack will not be able to generate more than max_replays messages, where max_replays is the maximal number of retries that the specific CACE has attempted. If an attacker succeeds in generating more then max_replays legitimate messages, the CAGE determines that a cloned CACE is attempting to get authenticated. In a preferred embodiment, max_replays can be set to one, in which case a replay that is not a result of a decreased counter, but a result of an old successful new session authentication exchange, is directly detectable as a cloning attempt.

The quadruplet <TUNI, OTP, retries [clue]> is thus delivered to the CAGE over RADIUS or a similar authentication protocol. The exact delivery process is known to the skilled person. The quadruplet may pass through several RADIUS proxies, and last one of them will detect—based on a predetermined convention—that the present TUNI belongs to a registered user of the CAN.

When the CAGE receives the RADIUS request, with the above quadruplet, it checks whether the quadruplet is legal. If the TUNI and the OTP are legal, then the CAGE approaches the HLR and verifies that the specific account associated with the current TUNI has not been revoked. If all checks verify, then the CAGE sends a RADIUS message indicating authentication success to the RADIUS client that had sent the request.

If the TUNI is legal, and the OTP is not, then in the SIM-based mode, the request is rejected. In the SIM-less mode, the CAGE checks if CACE cloning has occurred. If the CAGE detects cloning, then it revokes the user's account.

When the hot spot receives an authentication success indication from the RADIUS server, it sends a successful login screen to the CACE, and opens its port to WAN access.

It is noted that the IEEE 802.11 working group is currently working on the development of 802.1x, a new standard for port based access control that is to be incorporated into the 802.11 standard. 802.1x uses the EAP (Extended Authentication Protocol) to transport authentication information between a wireless station and an authentication server. EAP between the wireless station and the Hot Spot runs directly over 802.11. The Hot Spot uses RADIUS to relay the EAP messages to the authentication server. The Hot Spot authenticates (or rejects) the wireless station, according to the response it receives from the authentication server. When working with 802.1x compatible Hot Spots, the user laptop uses EAP as the authentication transport. EAP runs between the user laptop and the CAGE front end and is relayed by the Hot Spot on top of RADIUS. EAP releases us from the requirement to use only a single message to relay authentication information to the authentication server, hence it could be used as a transport to CAP resumed and new session authentication exchanges; thus in this case the Initial Access Approval Protocol can be emilimnated.

The Cellular Access Protocol (CAP)

As indicated in FIG. 3 above, the user device and the CAGE Front End execute CAP. CAP comprises exchanges that support the various stages of user communication: new session authentication, resumed session authentication, session control (billing) and session termination. All the exchanges are executed each time the user connects to the CAN. The authentication exchanges, including new and resumed session authentication, use an enhanced challenge response mechanism based on the GSM challenge response paradigm. Furthermore, the exchanges provide mutual authentication and guarantee user anonymity. CAP also creates cryptographic keys that can be used to create, as authentication or encryption keys, any optional secure channel for the application traffic, which may be provided as part of the traffic secure layer referred to above.

CAP, as with the initial access protocol, supports two authentication modes: a SIM-based mode and a SIM-less mode. A new session authentication exchange, to be described below, is the only exchange of any described herein that has substantial protocol differences between the SIM-less and the SIM-based authentication modes. All the other exchanges are absolutely or nearly identical in both modes.

New and Resumed Session Authentication Exchanges

All the exchanges of the CAP preferably run over an optional secure channel that provides confidentiality. The decision as to whether to use a secure channel to provide confidentiality to the CAP, and which type of secure channel to use is part of the configuration transferred by CSP. The secure channel, if desired, is established between the user laptop and the CAGE Front End (see FIG. 3) and can be implemented by such secure channel implementations as SSL, TLS or IPsec. The current IPsec standards do not work when the traffic is passed through a NAT (Network Address Translation) device. Hence, when the network includes NAT devices, the CAN preferably enables the customer to implement the secure channel by SSL or TLS. In a preferred option, the secure channel can be created using secret information that is generated by the previous new session authentication exchange (or by CSP) for the secure authentication or creation, thus creating a binding between the authentication protocol itself, and the secure channel.

The CAP preferably comprises two mutually exclusive session authentication exchanges: a new session authentication exchange and a resumed session authentication exchange. The resumed session authentication follows the new session authentication exchange and relies upon the symmetric authentication keys that are produced during the new session authentication process. The purpose of the resumed session authentication is to allow the user's laptop and the CAGE front end to efficiently resume an existing session. The user laptop and the CAGE can resume a session if the period elapsed since the last authentication is short and the IP address that the user laptop is using has not changed within this period. In the SIM-based authentication mode, the new session authentication exchange consumes a triplet from the HLR, while the resumed session authentication mode does not.

Each time the user connects, the CACE software tries to execute the resumed session authentication exchange. If the CAGE Front End detects that this is indeed a resumed session, it continues with the exchange; otherwise, it sends an error message to the user laptop. The error message triggers a new session authentication.

Figure 7:
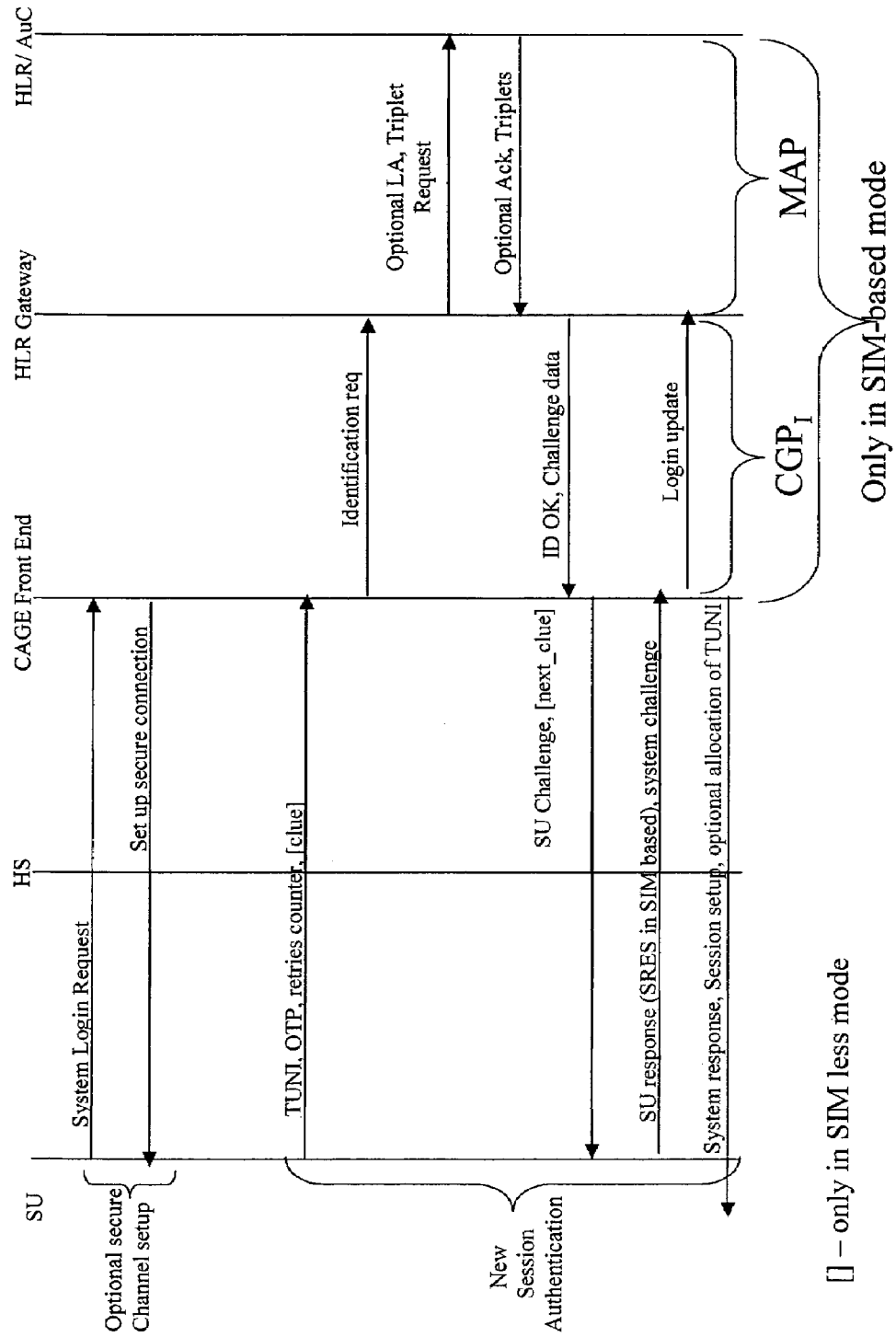
FIG. 7 is a simplified signal diagram indicating signal exchanges involved in new session authentication for both SIM and SIMless modes in the cellular access protocol according to a preferred embodiment of the present invention.

A sample message flow of the new session authentication protocol is depicted in FIG. 7, to which reference is now made. The new session authentication exchange is a challenge-response protocol and has two authentication modes: SIM-based and SIM-less. The new session authentication exchange mutually authenticates the user laptop and the CAGE, and links between the user and his cellular account. The exchange also produces an OTP generating key for the next initial access approval and new session authentication, and authentication keys for the resumed session authentication and for the creation or authentication of the optional CAP secure channel and the application traffic secure channel.

The authentication in the SIM-based mode of the new session exchange relies on the key stored in the SIM. The authentication uses a triplet that the CAGE HLR gateway retrieves from the HLR. The protocol used by the exchange is stronger in terms of security than the GSM authentication protocol, in the sense that it is protected from cryptanalytic attacks that had been successful in finding parts of the SIM $K_i$ by collecting challenge-response pairs. In an embodiment, such strengthening may be achieved by transmitting a keyed hash of the response, instead of the response itself, thus not exposing the response to the attacker.

The authentication in the SIM-less mode of this exchange relies on a master password which is stored in the user's device (KI_key), whether it be a laptop, palmtop or any other device. The SIM-less mode also has an anti-cloning mechanism, an example of which was described above, that enables the CAGE to detect cloning of the SIM-less master password.

When the new session authentication exchange is completed, the CACE software finds itself equipped with a next TUNI and OTP that it can use in the next initial access approval and any subsequent new session authentication exchange. If CSP has configured the CACE to use a secure channel to provide confidentiality to the CAP, or if the CAGE forces such a secure channel setup within CAP, then the next TUNI is generated by the CAGE Front End and transferred over the secure channel to the user laptop. Otherwise, if a secure channel is not being used, then both sides derive the next TUNI. In addition both sides generate a key that may now be used for the derivation of the following cryptographic keys:

Authentication key for a resumed session authentication exchange

Authentication and optional confidentiality keys for session activity control

Keys for the establishment of the (optional) CAP secure channel and the (optional) application traffic secure channel (see below).

Figure 8:
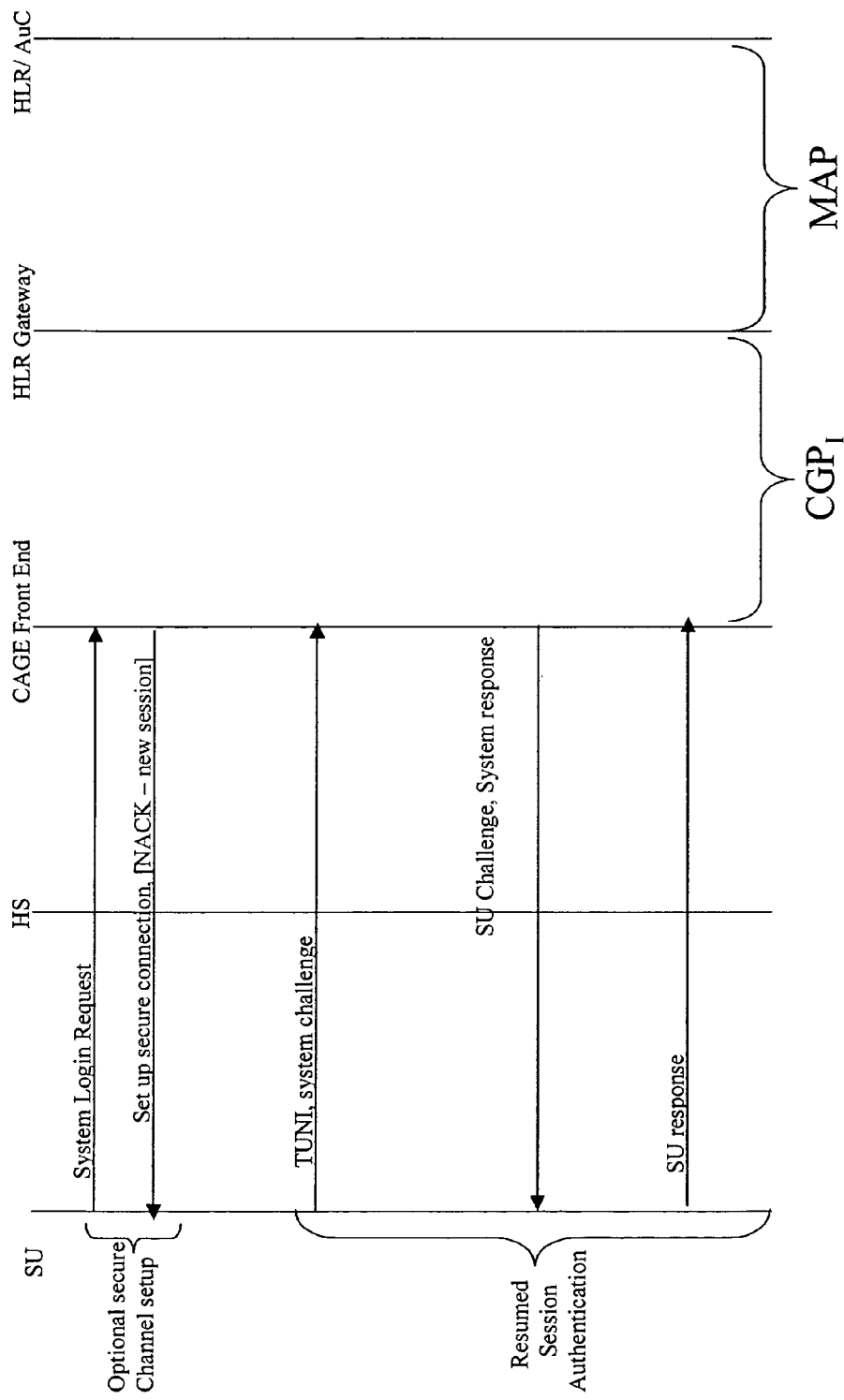
FIG. 8 is a simplified signal diagram indicating signal exchanges involved in resumed session authentication for both SIM and SIMless modes in the cellular access protocol according to a preferred embodiment of the present invention.

Reference is now made to FIG. 8, which is a simplified message flow diagram illustrating the resumed session authentication protocol. As shown in FIG. 8, the resumed session protocol performs mutual authentication between the CACE and the CAGE on the basis of an existing session. The exchange is identical for SIM-based and SIM-less modes. The authentication relies on an authentication key that is generated by the user laptop and the CAGE Front End during the new session authentication exchange. As shown in FIG. 8, an optional secure channel setup is followed by resumed session authentication itself. The latter entails a TUNI challenge by the user device and a respond ing challenge by the system, followed by a further response by the user device. The challenges and responses, as well as the setting up of the secure channel if desired, all occur between the user device and the cage front end and are relayed in either direction by the hotspot.

The session control part of the CAP, including usage and billing procedures, is implemented by a periodic exchange of keep-alive messages. Each keep-alive message carries data that contains traffic and billing information. The keep-alive messages are preferably authenticated; the authentication key having been derived during the new session authentication exchange. Optionally the keep-alive message can be privacy protected, with keys that are generated by the authentication exchange. Note that the integrity protected keep-alive protect the CACE and CAGE from session hijacking attacks.

The session control exchange is preferably also responsible for session termination. A session preferably terminates under any one of the following scenarios:

The user commands CACE to disconnect the session. In this scenario the CACE software sends a CAP disconnect message to the CAGE. When the user re-connects, the CACE executes the new session authentication protocol.

The CACE leaves the range of the Hot Spot. In such a scenario the CACE software notes that the session has been interrupted. When the CACE detects that it is again within coverage of the Hot Spot, it tries to resume the session by executing the resumed session authentication protocol.

The CAGE misses more than a constant or configurable number of keep-alive messages. The number may be configured as a constant or a function dependent on parameters like previous misses, communication conditions, etc. The CACE may not detect a session termination in the present scenario since the number of missed keep alive messages may not be known to the CACE. That is to say the messages may have been missed because they: were never received. Thus session termination may well depend on communication conditions unknown to the CACE. When the keep-alive messages resume, if the number of missed keep-alive messages is less than the number of allowed missed messages, CAGE accepts the keep-alive messages; if the missed keep-alive messages exceed this number, the CAGE sends a CAP message to the CACE, forcing it to re-authenticate. The CACE then tries to resume the session by executing the resumed session authentication protocol. It is up to CAGE to choose, according to its configuration, to accept session resumption or force a new session authentication.

The Cellular Gaping Protocol (CGP)

As discussed above, CGP (Cellular Gaping Protocol) is executed between certain components of the CAGE, and enforces the gap by restricting messages not in accordance with the gap from passing between the CAGE components. $CGP_I$ is preferably executed in the Identity Security Layer, between the CAGE Front End and the HLR Gateway. $CGP_I$ supplies services to CAP, thus the CAGE Front End sends a $CGP_I$ query to the HLR Gateway whenever it needs to:

Determine the status of a certain user account (revoked, expired, valid),

Determine the privileges of a user, or

Retrieve a triplet from the HLR for a new session authentication exchange.

$CGP_I$ can be triggered by messages sent by either CSP or CAP.

$CGP_S$ is another gap protocol and is executed in the traffic security layer, between the CAGE Front End and the Services Gateway. CGPs controls the Services Gateway access control policy, that is to say it is used to send control information to the firewall/security gateway 28. Although data that is not in conformity with the protocol is allowed in the traffic layer, only data that is in conformity with the protocol can control operation of the gateway. $CGP_S$ has relatively limited tasks, in particular it enables forwarding of application traffic from the CACE to The Mobile Operator IP network when a particular CACE has been authenticated. If the CACE is configured to use a secure channel for application traffic protection, then $CGP_S$ enables secure traffic between the CACE and the CAGE.

The Traffic Security Layer

As discussed above in respect of FIG. 2, the CAGE-based system relies on a two-dimensional architecture, with a traffic security layer and an identity security layer. Considering the traffic security layer in greater detail, the layer relies on, and is preferably bound to, cryptographic or other information derived from the authentication provided by the identity security layer. The traffic security layer in the CAN may be configured to offer the following services:

1. Application traffic confidentiality,
2. Application traffic integrity, and
3. Protection against application traffic replay The CAN supports several protocols for traffic security—IPsec ESP, and ESP with NULL encryption, SSL and TLS. Since the current IPsec standards do not work when a NAT device is installed between the IPsec source and destination, the CAN enables the customer to use SSL to implement the application traffic security layer. Such a restriction may be removed by installing NAT compliant IPsec modules.

If IPsec is used for application traffic protection then traffic security inherently has Perfect Forward Secrecy (PFS)—meaning that even if in the future an attacker exposes the SIM $K_I$, or the SIM-less master password, he will not be able to decrypt traffic that was encrypted by the IPsec ESP protocol.

The secure channel establishment can optionally use a symmetric key that is created by the new session authentication exchange of CAP, for the authentication or the creation of the secure channel, to assure binding between the entity authenticated by CAP and the entity establishing the secure channel for the application traffic.

Advantages of the CAN Security Architecture

To summarize, the CAN security architecture of the present embodiments ensures the following advantages to the system it supports:
  Modularity—separation into different security zones with different levels of security,
    Maximal protection for the most critical component in the Mobile Operator infrastructure—the HLR/AuC,
  Modularity—separation into layers
    Security advantage—separation of keys. Different keys are used for different types of authentication and for confidentiality. The system preferably ensures that if a specific key is exposed, then only partial damage is caused. Previously exchanged traffic remains secure.
    Separation of user authentication and anonymity from traffic confidentiality; thus even if no encryption is supported, authentication, integrity and anonymity hold.
    Flexibility—various protocols and algorithms can be implemented to provide confidentiality to CAP, and to provide protection to application traffic. Users are thus able to work in different networking environments, for example both with and without such a feature as NAT.
  Authentication mechanisms are improved, as described herein, such that certain known flaws of standard GSM authentication are fixed. As a result the CAN authentication scheme is not exposed to crypto-analytical attacks of the kind that have been launched against the GSM authentication scheme.
  Improved encryption mechanism
    Encryption, integrity protection and authentication algorithms are commercial standards
    Optional support of PFS—Perfect Forward Secrecy, for example if IPsec is used for traffic secure channel implementation.

Referring back to FIG. 2 and the outer firewall 28 is now discussed in greater detail. In general, a firewall has a set of logical rules to determine what traffic it allows through, what traffic is tested further or otherwise queried and what traffic is blocked. The set of rules defines the operation of the firewall.

The following is an example of a rule set for the outer firewall 28. Firewall 28 is preferably integrated within a VPN (virtual private network), so it can accept secure traffic, and forward it in the clear to the CAGE higher security zones. The rule table is preferably composed of two parts: dynamic rules and static rules, where the static rules control Identity Layer Security (authentication) traffic, and the dynamic rules control application (Traffic Layer) traffic. If the firewall is integrated with a VPN server, then the CAGE front end uses the $CGP_S$ protocol to configure the VPN with authentication keys that the Identity Security Layer derives from CAP authentication exchange. The VPN thus discards all application traffic that arrives from un-authenticated users (that do not have legal VPN authentication keys). In this case the dynamic keys are replaced by the VPN server, hence are not required. In an example in the table below, CAP is run over a secure channel that is implemented either by SSL or by IPsec.

Five static rules appear in the example. The first rule allows incoming secure CSP session. The second rule allows an incoming HTTP probe that the CACE uses to initiate authentication. The third rule allows incoming RADIUS sessions for initial access approval as exemplified by FIG. 9, and the fourth rule allows incoming secure CAP sessions. The fifth rule allows incoming secure management traffic. The skilled person will be aware of how to adapt the scheme to other protocols for similar functionality.

TABLE 1

Exemplary static rule set for outer firewall 28

| Rule name | Source IP | Dest IP | Protocol | Source port | Destination port | Filter Action |
|---|---|---|---|---|---|---|
| CSP | Any | CAGE IP | TCP | >1023 | (SSL or dedicated provisioning port) | Security required (if SSL is not used) |
| Probe (HTTP ping) protocol | Any | CAGE IP | TCP | >1023 | CAGE probe port (9080) | Permit |
| RADIUS | Any | CAGE IP | UDP | >1023 | 1812 | Permit |
| CAP | Any | CAGE IP | TCP | >1023 | CAGE secure authentication port (9443) | Security required |
| Management traffic | Any | CAGE IP | TCP | >1023 | Management protocol port | Security required |

After the CAGE authenticates a specific CACE, it preferably adds to the firewall a new rule that allows forwarding of incoming application traffic from the CACE through the outer firewall. If the CACE is configured to use IPsec to secure the application traffic, then the CAGE preferably adds to the firewall a rule that allows incoming IPsec traffic, and configures the VPN server (internal or external) with the keys required for the decryption and the verification of the traffic. The firewall may decrypt the traffic, by itself or with the assistance of external elements, and forward it to the inner firewall if used. If the CACE is configured not to use security for the application traffic, then the traffic is forwarded as is to the inner firewall.

Considering the inner firewall 32 in greater detail, the inner firewall is designed to provide access control to the mobile operator IP network 30. Only application traffic originating from authorized users laptops and intended for the IP network 30 is forwarded through firewall 32. The firewall is preferably configured by the $CGP_S$ protocol. The inner firewall 32 must be installed if the outer firewall 28 uses Ipsec or a like encrypted channel; since in such a case the application traffic is encrypted and thus cannot be filtered by the outer firewall.

The VPN server, outer firewall, and inner firewall can be implemented by one element or by two or more separate elements.

Whenever the CAGE finishes the authentication and authorization of a specific user, it uses CGP to add a rule or an authentication key to the outer firewall. The added rule permits the user to use all the services he has access to from the IP address of his CACE, Note that the application traffic in the above example always arrives at the inner firewall 32 in a clear, that is unencrypted, state.

Following is an exemplary description of SIM-based and SIM-less CSP, used to bind between a user and his cellular account as described above. CSP in both SIM-based and SIM-less modes has the following targets:

1. Providing the user with a first time TUNI, thereby enabling user anonymity,
2. Providing the user with a first time OTP generating key which can be used in Hot Spot initial access approval. In the SIM-less mode the OTP generating key is preferably transmitted over the CSP secure channel. In the SIM-based mode, the first OTP generating key is derived from the triplet that the HLR gateway had retrieved from the HLR during CSP authentication.

In the SIM-less mode, CSP has two more purposes:
1. To initialize the user laptop with an authenticated master password
2. To initialize the anti-cloning detection-mechanism In order to fulfill the above, the CACE must have Internet access. Preferably access should be via a provider that is not the CAGE's operator. Access could be via any of wired LAN, dial-up, free wireless LAN connection (free hot spot) or any other wireless access that is available. CSP preferably runs over a secure channel, for example SSL or IPsec, and the CAGE preferably verifies the use of the secure channel before it starts execution of CSP. In SIM-less CSP, the user is preferably able to send an SMS from his cellular phone.

SIM-Based CSP

The SIM-based CSP is almost identical to the SIM-based mode of the new session authentication in CAP. The main difference is that, in its first message, the CACE transmits the IMSI or an equivalent identifier known to the network, instead of the TUNI (since it does not yet have a legitimate TUNI), and it does not transmit an OTP. When the CAGE receives the first message with the IMSI or equivalent identifier, it verifies with the HLR that the user is entitled to use the services supplied by the CAGE, and authenticates the user's SIM.

SIM-Less CSP

Initially, in the present embodiment, CACE software is installed in the user's device. When the CACE software installation is completed, the user laptop preferably sends a setup request to the CAGE. The CAGE responds with an identification request. The user enters its permanent identity, e.g. MSISDN. The CAGE then sends to the CACE a short secret code that expires after a predetermined time, typically 10 minutes.

When the CACE user receives the secret code, the code is read by the user and then entered by him into an SMS message on the cellular telephone whose account it is intended to charge. The SMS is then sent from his cellular phone. When the CAGE receives the SMS—it checks if the code is legal, and that it has indeed arrive from a telephone associated with the given user. If the check succeeds, CAGE optionally verifies with the HLR that the user has the privileges required. Note that the Mobile Operator may decide as a policy that all subscribers are entitled to the service or that only some subscribers are entitled, and in the latter case there may be for example a list of permitted subscribers or there may be blacklist of banned subscribers or there may be a set of logic rules for selecting users or some of combination of the above methods. CAGE then checks if the present CACE was previously set up beforehand and if its permissions have been revoked for any reason. If all checks succeed, then the CAGE sends the first TUNI and KI_key—the master authentication password, to the CACE.

An Example of CAP Implementation

Figure 9:
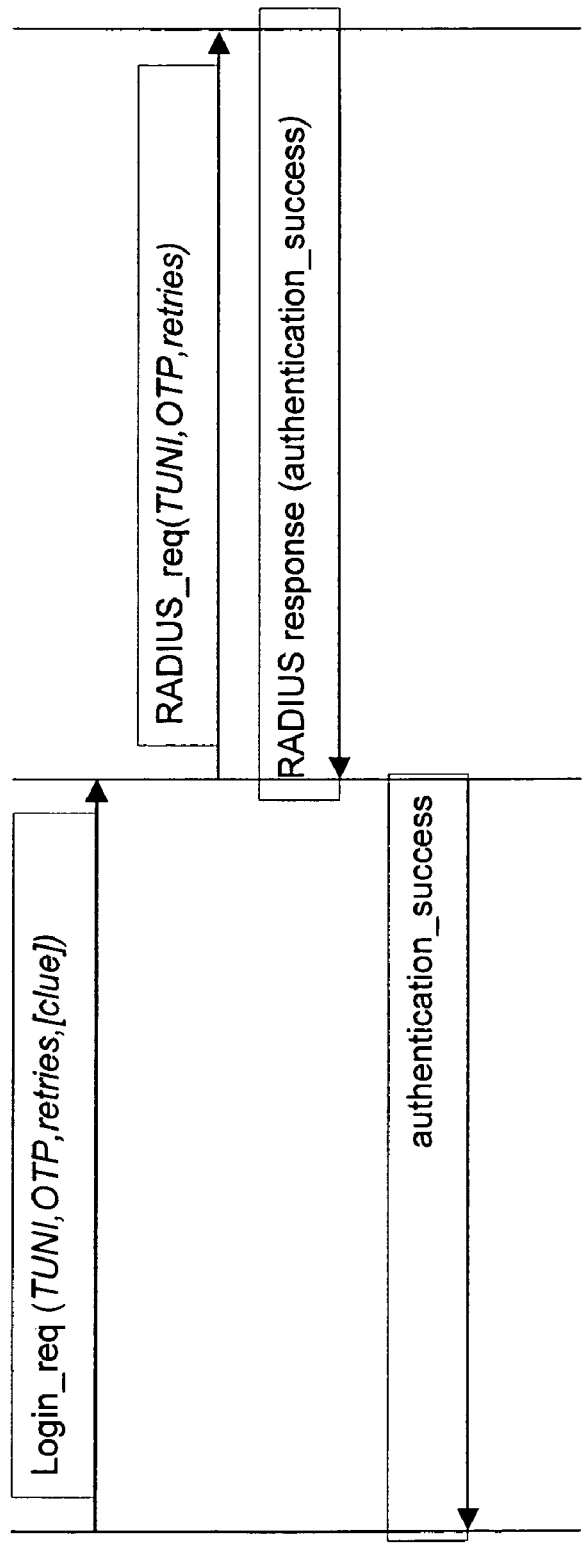
FIG. 9 is a simplified signal diagram indicating overall signal exchange between a client unit and a CAGE via an access gateway.

As explained above with respect to FIG. 3, and in greater detail in FIGS. 7-9, the initial access from the user device to the CAGE front end is carried out using the cellular access protocol. In the following an example is given of CAP implementation for the preferred embodiments of the present invention.

A New Session Authentication Protocol—FIG. 7

The CAGE is intended to link authentication of a user to his GSM account, for billing purposes. In the SIM-based mode of the new session authentication protocol, linkage is achieved via the SIM. In the SIM-less mode, the CACE preferably possesses initial authentication material, for example a strong password that may be stored in protected form on the user's laptop. Such a password may have been provided to him out of band during setup after authentication to his GSM provider using his cellular phone SIM.

Requirements for the New Session Authentication Protocol

Requirements for the Protocol

1. The protocol is preferably able to support WISPr: the requirement comprises an ability to create an authentication mechanism, based on a single message, that enables the CAGE to determine if the user is a legal user of the CAN. Such a mechanism is preferably protected against replay and dictionary attacks, for example using a one-time password mechanism.

Requirements for the SIM-Less Mode of the Protocol

1. The SIM-less authentication is linked to the user's GSM account. This means that only a legal GSM user can obtain a legal out of band password to be used for the SIM less authentication.

2. When SIM-less authentication is being used, it is assumed that the authentication information can be duplicated; hence as discussed above, the present embodiments include mechanisms that detect cloning of the CACE. These anti-cloning mechanisms preferably rely on synchronization of initial sessions between the CACE and the CAGE and are described in greater detail below.

Protocol Overview

Authentication between the CACE and the CAGE is based on the challenge response protocol, as described above. The protocol is designed along the lines of the standard SIM based secure GSM authentication protocol, and runs over an optional secure (Ipsec) channel. Unlike the standard GSM authentication protocol, the protocol of the present embodiments provides mutual authentication. In addition the protocol contains a built-in mechanism for one-time password generation, for example for WISPr purposes and requirement no. 1 above, and for SIM-less password cloning detection.

The new session authentication protocol is a four-message protocol and it is based on challenge-response as will be described below. The protocol is designed along the lines of the standard SIM based secure GSM authentication protocol, but unlike the standard GSM authentication protocol, it provides mutual authentication. In addition it contains a built in mechanism for one-time password generation, again for WISPr purposes, and for SIM-less password cloning detection.

The protocol can for example run either over TCP, UDP, or EAP. The initiator, in general the CACE, is responsible for retries and re-transmissions.

In the present section we describe the exchange of messages and the operations each side must execute at each exchange—both being identical for the SIM-less and the SIM-based versions. The calculations between the SIM based and the SIM-less only differ in the following:

1. A key, derived from the key generated by the SIM during the last new session authentication, is used as the OTP generating key in the calculation of the OTP in the SIM-based version. In the SIM-less version the master password is used as the OTP generating key.

2. The challenges the CAGE issues to the CACE in the SIM based version are generated by the HLR, as well as the $K_c$ and the sres The authentication process is the following, where features in square brackets appear either in SIM-less version, or if an optional secure channel is used and arrows indicate the direction of the signal:

| CACE | | CAGE |
|---|---|---|
| → | TUNI, challenge1, OTP, retries, [clue] | |
| | Sres1, challenge2, [next_clue] | ← |
| → | sres2 | |
| | ACK, [next_TUNI] | ← |

Notes:

1. The protocol does not allow transmission of the IMSI. If for some reason the TUNI is lost, then the user is required to execute the set up process again 2. The CAGE decides whether to assign a new TUNI to the CACE according to its own policy. If it decides to send a new TUNI, then it either sends it (if the CACE is configured to use a secure channel), or it sends a change_TUNI instruction, that causes both sides to calculate the new TUNI.

3. If the CAP is not configured to use a secure channel, then $K_c$ is used in the calculation of the one-time password in the SIM-based version of the new session authentication, and of the next TUNI. All the security of the one time password and the proposed TUNI mechanism is based on the security of $K_c$. In standard GSM, $K_c$ is used as an encryption key, and as such it can be cracked—given enough messages encrypted with the same key. The CAN authentication protocols use $K_c$ as an integrity key (to the PRF), hence $K_c$ is not exposed to attacks like those that are launched against standard GSM encryption.

4. When SIM-based authentication mode is used, the response to the challenge is generated in the standard GSM way, i.e. by the A8 algorithm. The A8 algorithm is exposed to attacks on $K_I$ if the attacker collects enough <challenge, response> pairs. CAP is protected from such an attack, since both parties feed the responses into a one-way function before sending and verifying the response.

5. Clue and next_clue are sent only in the SIM-less version of the new session authentication protocol.

6. Some of the fields can be moved to other messages without affecting the security of the protocol, if such is desired for reasons of calculation efficiency.

As explained above, the protocol is a two-way challenge response handshake. The initiator of the handshake is the CACE. The CACE is also responsible for all retries and retransmissions.

In the following, the individual messages of the four-message protocol are looked at in greater detail.

Message #1

The first message contains the CACE's temporary identity (the TUNI), and a random challenge that the CACE sends to the CAGE, whose purpose is to authenticate the CAGE. The TUNI is linked to the user's cellular identity (e.g. the GSM IMSI) and the CAGE generates the TUNI. The CACE does not need to use the known cellular identifier. The CACE gets the first TUNI during CSP. In an embodiment, if the protocol is running over an insecure channel, then the TUNI is not in fact sent but rather both sides separately calculate the TUNI.

The next two fields, OTP and retries, serve two purposes—they serve as an OTP (One Time Password) that enables the user to login into a Hot Spot, and the CAGE to detect replay attacks, and they are used by the CAGE for SIM-less CACE cloning detection. The last field—clue is used by the cloning detection mechanism—the CAGE uses it to verify that it indeed generated challenge2 that is used in the OTP calculation. Only a SIM-less CACE transmits this field, as discussed above.

OTP is the result of a pseudo-random one-way function (a PRF) with the parameters: the OTP generating key (this is the key to the PRF), the challenge that was transmitted by the CAGE in the last successful new session authentication, and the retries counter.

If the CACE does not receive message #3 (response from the CAGE) see below, after a configurable timeout, then it increments retries, generates a new OTP, and sends a new message #1 to the CAGE.

When the CAGE receives message #1, it first identifies the CACE to determine if it is using a SIM-less or SIM-based mode of the protocol. It then checks if the combination of TUNI, OTP, retries and clue (if it exists) is legal. If it is legal, then it generates and sends the second message to the CACE. If the TUNI is legal, and the OTP is not, CAGE determines if it is receiving a replay, or in the SIM-less mode, a cloned CACE. If the CAGE detects CACE cloning, then it revokes the user's account.

Message #2

The CAGE computes sres1 (the response to the challenge challenge1). In the SIM-based mode, the CAGE uses $K_c$ from a triplet <rand, sres, $K_c$> that it retrieves from the HLR in the generation of the response sres1—the CAGE's knowledge of $K_c$ proves its authenticity. In the SIM-less mode, the CAGE uses the password (KI_key) that it generates during CSP for the generation of sres1. Note that as mentioned above, an alternative embodiment includes CAGE responding to a CACE challenge after CACE has correctly responded to the challenge from CAGE.

In the second message CAGE also sends challenge2 to the CACE. challenge2 is a challenge that the CAGE uses to authenticate the CACE.

If the CACE is SIM-based, then it sets challenge2=RAND from the triplet.

If the CACE is SIM-less then the CAGE generates a random string next_clue, and derives challenge2 from a secret string local to the CAGE and from the random string next_clue. The purpose of such a generation method is to enable the CAGE to identify challenges that it generated in the past. Such identification is used by the CAGE's cloning detection mechanism described hereinabove. The CAGE sends both challenge2 and next_clue to the CACE.

When the CACE receives the second message, it verifies CAGE's response—sres1. If the response is legal, then it computes its response to challenge2-sres2, and sends it to the CAGE.

If the CACE is SIM-based, then it uses the SIM to generate sres2 and $K_c$, and uses $K_c$ to calculate the expected value sres1. If the CACE is not SIM-based then it uses the secret key shared by the CACE and the CAGE (KI_key) to calculate sres2, and the expected value of sres1.

The CACE then checks if the expected value of sres1 and the value that the CAGE sent in the second message are equal. If they are equal, then the CACE authenticates the CAGE and sends message #3 to the CAGE.

Message #3

Message #3 consists of only a single field—sres2, the response of the CACE to challenge2—that the CAGE had sent in the second message.

A SIM-based CACE uses the SIM to create sres2 and $K_c$ from challenge2. A SIM-less CACE preferably derives sres2 from the KI_key and challenge2.

If the CACE does not receive message #4 after a configurable time-out, then it resends message #3.

When the CAGE receives the third message, it verifies the value of sres2. If the value is legal, then the CAGE knows that the CACE is authentic, and generates the fourth message.

Message #4

Message #4 is an acknowledgement message that the CAGE sends to the CACE. Message #4 contains an ACK, and an optional TUNI. If the CAGE decides that it needs to replace the TUNI that the CACE is using, then it sends the new TUNI in message #4. Preferably the message is integrity protected, with keys derived by the parties.

If the protocol is running over an insecure channel, then CAGE only sends a change_TUNI instruction to the CACE, and both sides separately calculate the next TUNI.

A Resumed Session Authentication Protocol

In the above, the CAP protocol was discussed for a new session. In the following, authentication for a resumed session is discussed with particular reference to FIG. 8. The CAP protocol runs on top of an optional secure channel, as described above. The message exchange is summarized as follows:

| CACE | | CAGE |
|---|---|---|
| → | TUNI, challenge1 | |
| | sres1, challenge2 | ← |
| → | sres2 | | where: challenge1 and challenge2 are two random strings, xres1, xres2, sres1, and sres2 are the result of a PRF applied to challenge1 and challenge2 respectively. The key to the PRF is CACE_$K_c$, the authentication key that was derived in the last successful new session authentication exchange. Both the CACE and the CAGE compute xsres1 and xsres2 and verify that they get the sres1 and sres2 respectively.

Client-Less Units

Figure 10A:
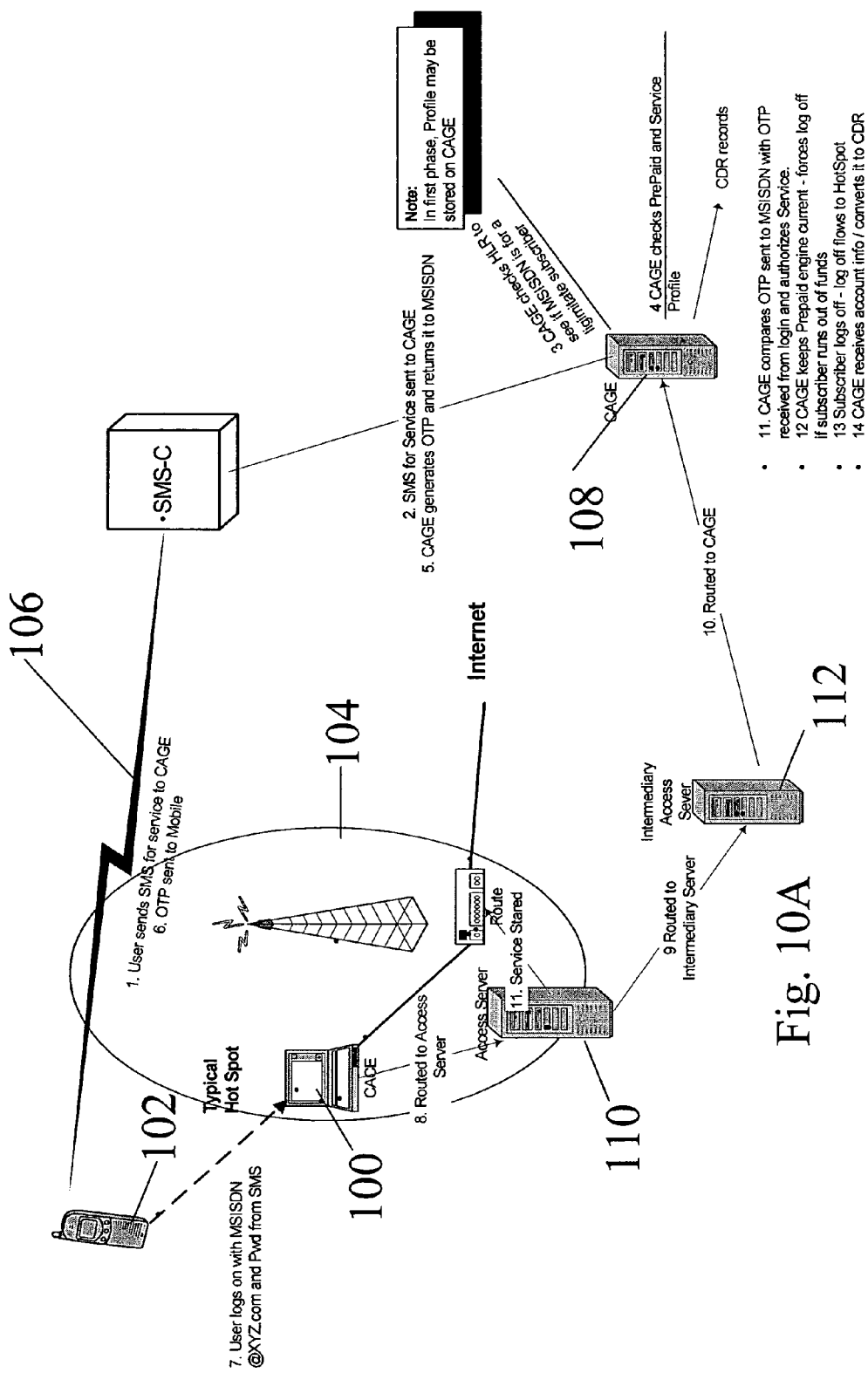
FIGS. 10A and 10B are overall system diagrams showing signal exchange over an underlying architecture for authentication of a clientless module according to a further preferred embodiment of the present invention.
Figure 10B:
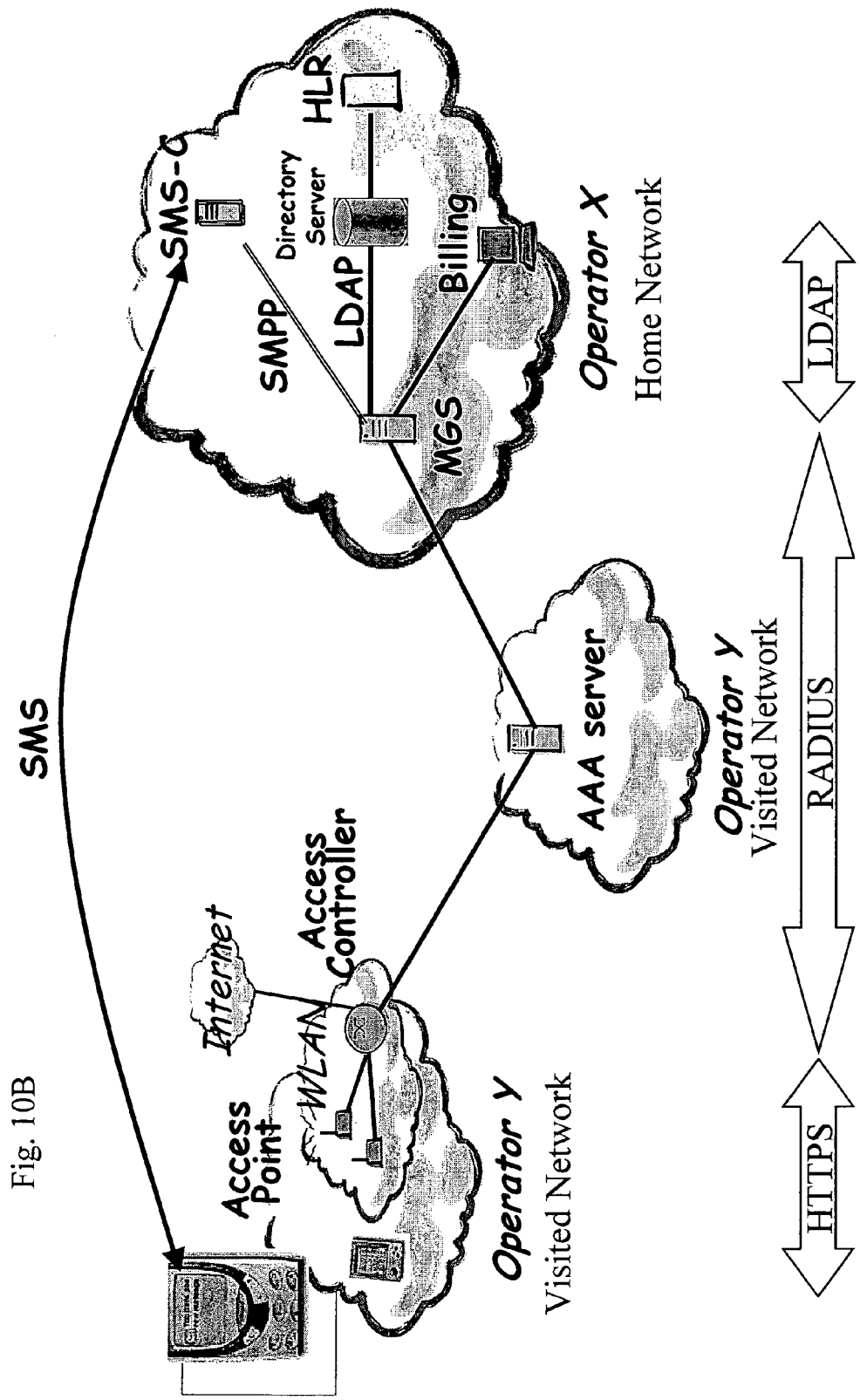

In the above, the user device attempting to connect to the hotspot either had a SIM or at least had some kind of client entity. Reference is now made to FIGS. 10A and 10B, which illustrate a system architecture and solution to allow a cellular carrier to offer its subscribers access to Internet and other remote services, within or outside the cellular network, from Hot Spots and like wireless local networks, where the users accessing the local network are in possession of data terminals with no special client software to access or be authenticated by the cellular network.

The present embodiment supports any terminals that are capable of connecting to the local network, such as laptops, PDAs, etc., without requiring them to have direct access to the cellular network or to incorporate special identification hardware (e.g. SIM cards).

The present embodiment preferably ties access authorization achieved by a user's clientless terminal 100 to the subscriber's mobile telephone 102 and associated account.

The underlying requirements for the clientless embodiment are:

1. There is no special software, that is no client, installed within the subscriber's data terminal 100.

2. The basic service offered is Internet access. Access to the Internet may be expanded to include other services supported by the cellular carrier such as location based service, email, MMS, etc.

3. The solution applies to all types of cellular networks, including those that do not already support packet data services such as GPRS.

4. The number of supported users may vary from just a few to all subscribers of the cellular carriers.

5. The present embodiment is preferably supported by direct agreements between the cellular carrier and operators of the Hot Spots, or by agreements between the cellular carrier and a third party having agreements with the operators of the Hot Spots.

Figure 11:
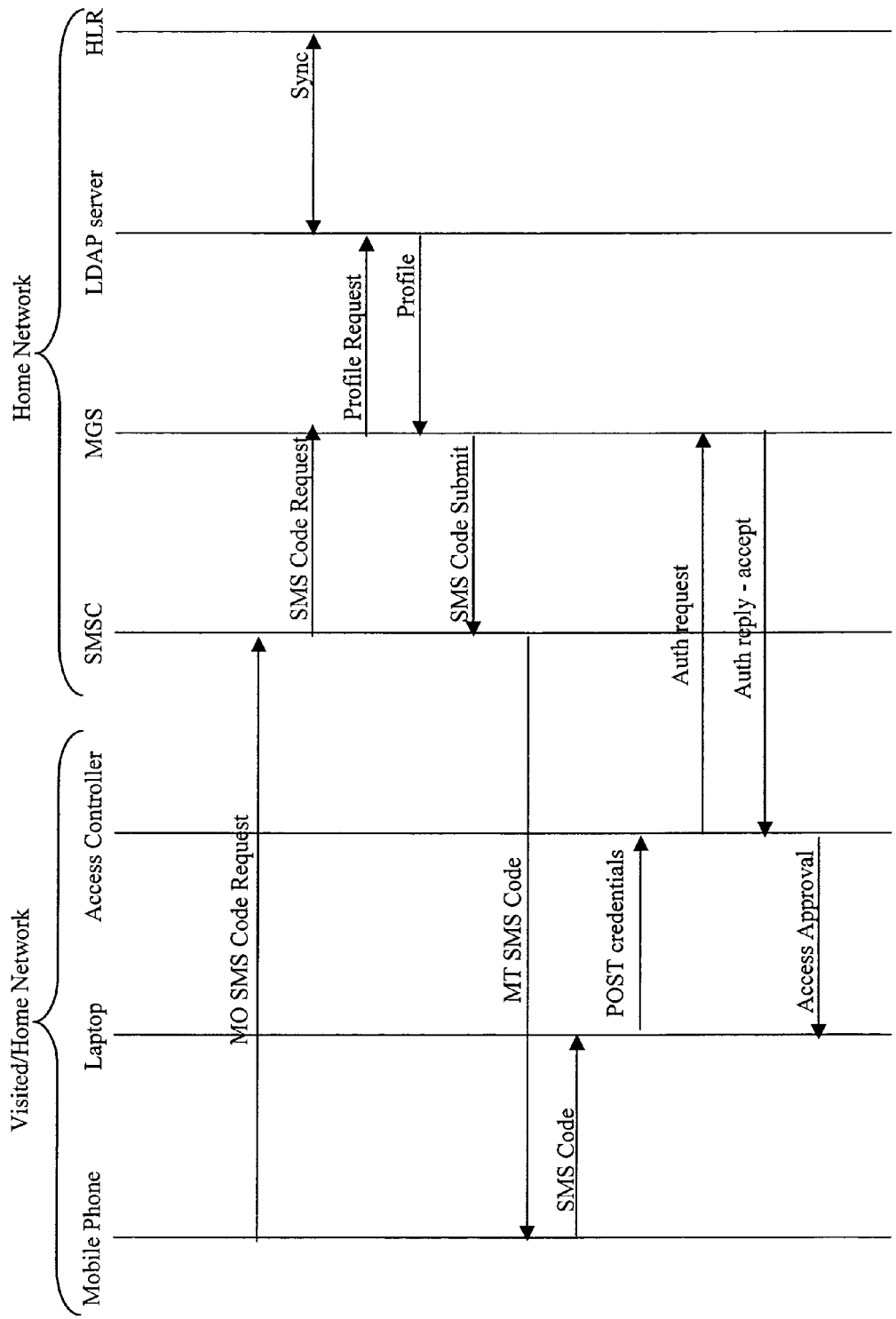
FIG. 11 is a simplified signal diagram illustrating signal exchange for authentication of a clientless device according to one preferred embodiment of the present invention.
Figure 12:
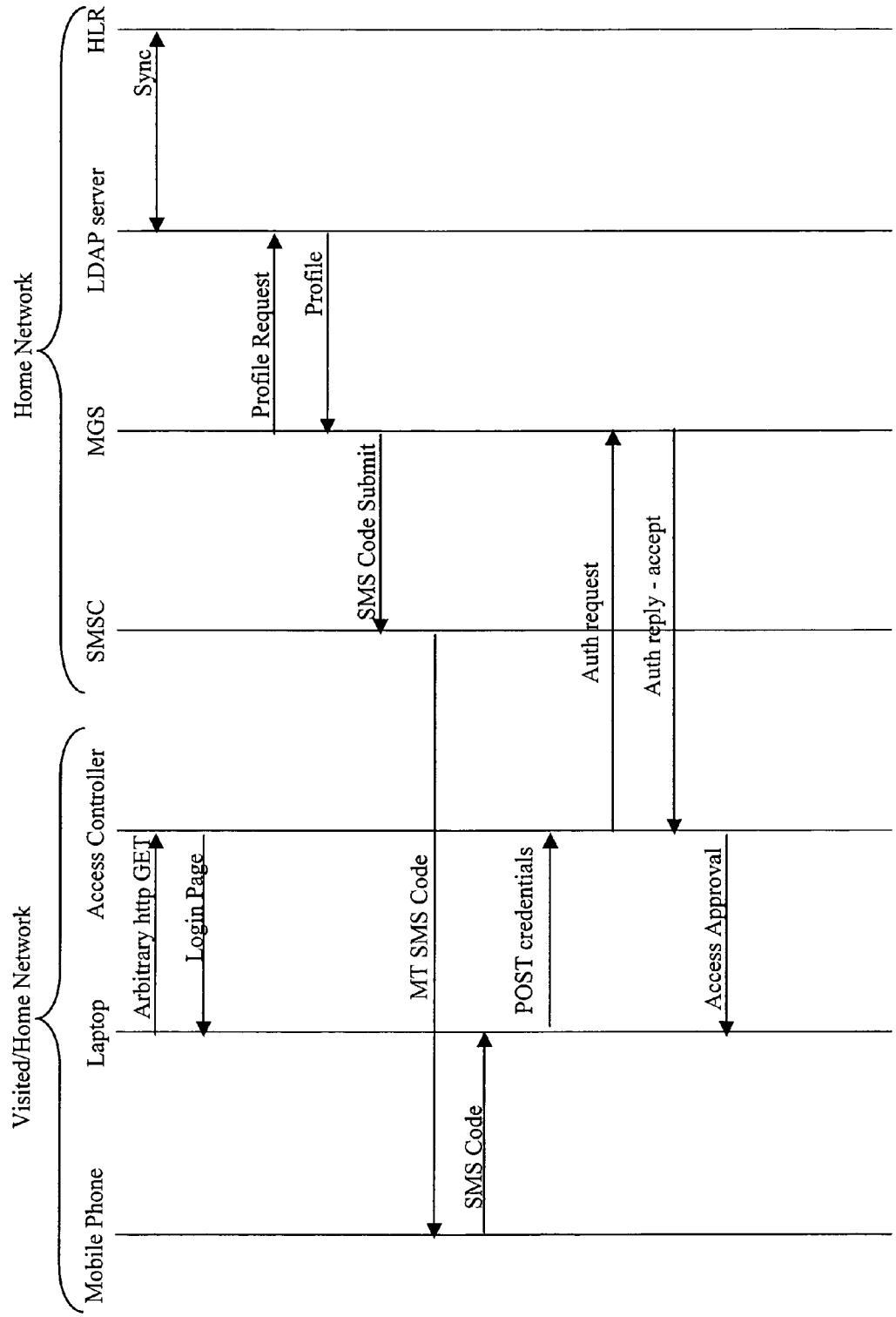
FIG. 12 is a simplified signal diagram illustrating signal exchange for authentication of a clientless device according to another preferred embodiment of the present invention

Two sub-embodiments are described herein and the corresponding signal exchanges are illustrated in FIGS. 11 and 12. Sub-embodiment 1 has the advantage of being easier for the user, whereas sub-embodiment 2 has the advantage of a quicker response. These two sub-embodiments are summarized below.

Sub-embodiment 1 is defined as follows:

1. The user enters a Hot Spot 104, launches his browser and finds the available networks. Likewise the Hot Spot 104 finds the user, who sees a log on screen at his browser.

2. The user sends an SMS 106 to a predefined telephone number belonging to the Cellular Access Gateway Entity (CAGE) 108, the authentication unit as described hereinabove.

3. The CAGE analyzes the sender MSISDN which is obtained from the SMS, to determine which carrier supports the present subscriber and thus which HLR should be consulted. An HLR query is preferably made into the SS7 space in order to confirm the subscriber, but may often leads to an external or foreign HLR. Such circumstances may represent a problem since it must be determined that the subscriber requesting access belongs to a cellular carrier who actually offers the access services through the CAGE presently being used. The offered service is not necessarily denoted by fields within the HLR.

4. In response to the SMS, the CAGE 108 preferably uses the incoming MSISDN to query, either directly or indirectly, the HLR or any corresponding entity for the Mobile IMSI. A proposed message for use by the CAGE is SEND_ROUTING_INFORMATION_SMS (SRI-SMS).

A key point of concern in the above-described procedure is that it is relatively easy to send an SMS to the CAGE and fake the return address. A countermeasure to such vulnerability is discussed hereinbelow.

5. The HLR or equivalent assures the CAGE that the MSISDN is currently live on the network as follows:

a. For a legitimate subscriber, the IMSI, MIN or other definite identifier and E164 or serving switch identification of the serving MSC is returned.

b. For a non-subscriber, an error message is returned.

6. Optionally, the CAGE then checks with the PrePaid engine(s) to determine if the subscriber has available funds.

7. If the HLR (or corresponding data base) has been provisioned with a service profile, the CAGE 108 checks with the database to determine privileges.

8. CAGE 108, after checking as much as it can, generates an OTP (one time password) valid for a limited time (e.g. 5 to 10 minutes) and returns it to the Mobile number indicated via SMS. SMS routing is done via IMSI or equivalent identifier, as opposed to a straightforward reply, so that if the message is delivered, it is ensured that it is the legitimate mobile who receives it.

9. The SMS optionally contains text that provides, or explains how to construct, a log on name and password.

The result of steps 5-9 is that in case of unauthorized (hacker) attacks, where the inquiry stems from an illegitimate subscriber, the legitimate subscriber whose identity is being attacked receives a message that he did not ask for, an annoyance, but otherwise no harm is done. The legitimate user simply takes no notice of the message.

10. A legitimate user then logs in through his device with an identifier that identifies him as a subscriber to the cellular carrier, either directly (e.g. MSISDN@Carrier_Name) or indirectly within a username space, and preferably also adds a One Time Password supplied by the CAGE, for example in the reply SMS.

11. The Hot Spot routes the access request to its authentication server, for example access server 110, which, upon identification, requests authorization over an agreed-upon protocol (e.g. RADIUS) The authorization may be obtained directly from the CAGE or from an intermediary service provider and intermediary access server 112 that goes on to request service from the CAGE 108.

12. The CAGE preferably authorizes the requesting authority, that is typically the operator of the Hot Spot, to offer services based on a One Time Password.

13. The requesting authority activates the Hot Spot and an accounting collection function.

14. The subscriber obtains Internet access and other defined services, including services specific to the hot spot.

15. If the subscriber is prepaid, the CAGE may continue to check PrePaid status. Activity is preferably indicated against the Prepaid rating, based on the time of the session or whatever charging arrangement is deemed appropriate, and a counter indicating prepaid status is adjusted according.

16. When a subscriber logs off, the Hot Spot closes the connection and sends accounting info to any parties with whom the system defines near real time reporting needs, in general meaning the subscriber's cellular provider. Alternatively, the Hot Spot operator may send a report in non-real time, e.g. on a monthly basis.

17. If an intermediary party has been involved in providing the service, then the intermediary party may supply CAGE or a billing authority within the cellular carrier with charging information (via XML or any other agreed upon format)

If CAGE 108 receives billing information, it preferably reformats the charging data received into the CDR or any other agreed upon format for input to the cellular carrier billing system.

Alternative Sub-Embodiment

Sub-embodiment 2 is very similar except that the procedure starts with an earlier stage in which the User logs on to the Hot Spot in a Guest mode, using his clientless terminal 100. Initial contact with the Cage 108 can therefore be made directly from his terminal 100 and he does not have to initiate an SMS exchange, although the may do so. The remainder of the procedure is the same as for the first sub-embodiment. The signal exchange procedure is illustrated in FIG. 12.

The two approaches both have the same exposure to attempted hacking resulting in nuisance SMS messages. Sub-embodiment 2 requires only a single SMS and thus is faster and simpler for the user. Sub-embodiment 2 however requires the user to know how to log on as a guest to the Hot Spot. Sub-embodiment 1 requires the user to know the telephone number of the CAGE and be able to initiate the SMS exchange. Sub-embodiment 2 is advantageous when SMS delivery becomes problematic. If both sub-embodiments are available then the user has the option of selecting between logging on as a guest and initiating an SMS exchange.

It is expected that during the life of this patent many relevant variations of hotspots, LANs, SMS's and cellular networks will be developed and the scope of the terms "hotspot", "LAN" "SMS" and "cellular network" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A multiple element gateway entity for supporting cellular authentication of cellular service subscribers communicating from an external Internet Protocol (IP) network to a cellular service IP network that resides in a cellular access network, wherein the multiple element gateway entity:

resides at the cellular access network; and receives communication signals from a plurality of cellular subscribers via the external IP network; and wherein the entity comprises:

a front-end gateway element configured to:

communicate with the external IP network;

process received communication signals;

deliver subscriber specific authentication and security data to the cellular infrastructure gateway element using a first secured protocol;

receive subscriber related authorization information from the cellular infrastructure gateway using a first secured protocol;

process subsequently received communication signals directed toward the cellular service IP network;

bind subscriber related authorization information with the subsequently received communication signals; and deliver only authorized subscriber's subsequently received communication signals to a services gateway element using a second security protocol;

a cellular infrastructure gateway element configured to:

interface with one or more cellular infrastructure components of the cellular networks that manage cellular subscriber related information;

process subscriber specific authentication and security data according to a first secured protocol;

deliver the processed subscriber specific authentication and security data to the cellular infrastructure;

receive subscriber related authorization information; and communicate the subscriber related authorization information back to the front-end gateway element using a first secured protocol;

a services gateway element configured to:

communicate with the cellular service IP network;

process received communication signals according to a second security protocol; and deliver the processed IP communication signals toward the cellular service IP network.

2. The multiple element gateway entity of claim 1, wherein the subscriber specific authentication and security data comprises GSM triplet information.

3. The multiple element gateway entity of claim 1, wherein the subscriber related authorization information further comprises status information.

4. The multiple element gateway entity of claim 1, wherein said binding is cryptographic binding.

5. The multiple element gateway entity of claim 1, further comprising secure channel support functionality for supporting a secure channel to a subscriber at said external IP network.

6. The multiple element gateway entity of claim 5, wherein said secure channel is allowed to said subscriber only as long as said subscriber is authenticated.

7. The multiple element gateway entity of claim 5, wherein said secure channel is configured to carry communication traffic.

8. The multiple element gateway entity of claim 1, further comprising a first firewall connected between the front end gateway element and the external IP network.

9. The multiple entity gateway entity of claim 1, further comprising a security gateway.

10. The multiple element gateway entity of claim 8, configured to supply said first firewall with a rule set comprising static rules to allow through signals belonging to said authentication procedure.

11. The multiple element gateway entity of claim 8, further configured to supply with a rule said first firewall dynamically with authentication data of a subscriber, wherein said rule permits the passage of data related to a subscriber.

12. The multiple element gateway entity of claim 8, wherein said first firewall is configured to restrict access to signals originating from applications within an authenticated subscriber, wherein said applications are recognized as compatible with said gateway.

13. The multiple element gateway entity of claim 8, wherein said first firewall is operable to receive from said cellular authentication at least one key, said firewall being configured to pass only material corresponding to the key.

14. The multiple element gateway element of claim 13, wherein said key is at least one of an authentication key, an encryption key and a key providing both authentication and encryption.

15. The multiple element gateway entity of claim 12, wherein said first firewall is configured to restrict access from non-authenticated subscribers to signals originating from applications within said subscriber which are recognized as supporting said cellular authentication procedure.

16. The multiple element gateway entity of claim 1, further comprising a second firewall connected between the services gateway element and the cellular service IP network.

17. The multiple element gateway entity of claim 16, wherein said second firewall has a rule set for allowing signals to pass, the entity being further configured to supply said second firewall with a rule, said rule permitting passage of data involving a subscriber, said supply being dynamically with authentication of said subscriber.

18. The multiple element gateway entity of claim 1, wherein the one or more cellular infrastructure components comprises a home location register.

19. The multiple element gateway entity of claim 1, wherein the subscriber specific authentication and security data is obtained during execution of an access protocol from a connecting subscriber's device.

20. The multiple element gateway entity of claim 19, where the subscriber specific authentication and security data is obtained from a SIM of a subscriber's device if present, otherwise from a virtual SIM if present, otherwise from a client entity of said subscriber's device and otherwise from a communication independently received from a subscriber's cellular device.

21. The multiple element gateway entity of claim 1, configured to provide initial access to a connecting device via exchange of a single message with said connecting device.

22. The multiple element gateway entity of claim 21, wherein said initial message contains at least one of a temporary identity, a one-time password and a retries counter.

23. The multiple element gateway entity of claim 22, further configured to identify a situation in which two connecting devices attempt to authenticate themselves based on a single security element.

24. The multiple element gateway entity of claim 1, wherein the authentication further comprises use of a one-time password.

25. The multiple element gateway entity of claim 1, wherein the authentication comprises use of a temporary user identity.

26. The multiple element gateway entity of claim 1, wherein the authentication comprises a new session authentication procedure and a resumed session authentication procedure.

27. A user client for use with a multiple element gateway entity, the gateway entity being installed in a cellular network and comprising a plurality of elements each located at a different one of a plurality of secure zones and having at least a first gap between said entities across said secure zones, said gateway being configured to predefine communication signals allowed across said first gap between said entities, thereby to filter out signals not part of an authentication procedure, and provide secure cellular authentication for a communication originating from a non-cellular network, the user client comprising usability for connecting to a wireless local network and usability for supporting said cellular authentication via said gateway entity installed in said cellular network by using a virtual SIM.

28. The user client of claim 27, wherein the virtual SIM is used during initialization of a communication session between the subscriber and the multiple gateway entity over a secure channel.

29. A method for supporting cellular authentication of a cellular subscriber that is connected to a non-cellular network by a cellular network gateway to a non-cellular network, comprising the steps of:
- setting a first rule to prevent exchange of data from non-authenticated devices over a communication route,
- receiving data from a connecting device on the non-cellular network,
- authenticating said connecting device over an authentication route using cellular authentication, and
- setting a second rule to permit said connecting device when authenticated to exchange data over said communication route.

30. An apparatus for supporting cellular authentication from a non-cellular network, wherein the apparatus is installed in a cellular access network and provides access to a plurality of the cellular subscribers to the cellular service IP Network via said non-cellular network, comprising:
- a first route that securely connects said non-cellular network to a cellular authentication infrastructure at a cellular network;
- a second route that securely connects said non-cellular network to a cellular service Internet Protocol (IP) Network; and
- a communication gateway at said second route for allowing data to pass along said second route only if said data is part of a communication involving a device on said non-cellular network which is authenticated by said cellular authentication infrastructure at said cellular network.

31. An authentication mechanism for use with a non-cellular network able to securely access a cellular authentication infrastructure at a cellular network from a non-cellular connecting device, wherein the authentication mechanism locates in a cellular access network and provides access to a plurality of the cellular subscribers to the cellular service IP Network via said non-cellular network, the mechanism comprising:
- a cellular access protocol for allowing said non-cellular connecting device to securely obtain authentication from said cellular authentication infrastructure at said cellular network; and
- a binding mechanism for binding said connecting device to said authentication so that only usage associated with said connecting device for the duration of said authentication is allowed via said non-cellular network, wherein at least part of said cellular access protocol comprises exchanging messaging with a cellular device to whose identity said connecting device intends to be bound.

32. The authentication mechanism of claim 31, wherein said connecting device comprises an authentication client.

33. The authentication mechanism of claim 32, wherein said authentication client comprises a SIM.

34. The authentication mechanism of claim 33, wherein said SIM is a virtual SIM.

35. The authentication mechanism of claim 31, wherein said exchanging messaging is a one-way exchange between said cellular authentication infrastructure and said cellular device.

36. The authentication mechanism of claim 31, wherein said exchanging messaging is a two-way exchange between said cellular authentication infrastructure and said cellular device.

37. The authentication mechanism of claim 35, further configured to identify a situation in which two connecting devices attempt to authenticate themselves based on a single security element.

38. The authentication mechanism of claim 36, further configured to identify a situation in which two connecting devices attempt to authenticate themselves based on a single security element.

39. The authentication mechanism of claim 31, further configured to use said authentication to guarantee billing information of said connecting device.

\* \* \* \* \*